United States Patent [19]

Mitchell et al.

[11] Patent Number: 5,987,614
[45] Date of Patent: Nov. 16, 1999

[54] DISTRIBUTED POWER MANAGEMENT SYSTEM AND METHOD FOR COMPUTER

[75] Inventors: Phillip Merle Mitchell, San Jose; Francisco Velasco, Los Gatos; Xuyen N. Phung, San Jose, all of Calif.

[73] Assignee: Vadem, San Jose, Calif.

[21] Appl. No.: 08/877,140

[22] Filed: Jun. 17, 1997

[51] Int. Cl.$^6$ ........................................ G06F 1/32
[52] U.S. Cl. ................. 713/300; 713/310; 713/323; 713/324; 710/9; 710/16; 710/18
[58] Field of Search ................. 395/750.01–750.08, 395/828, 829, 830, 835, 836, 838; 713/300, 310, 320, 322, 323, 324, 330, 340; 710/8, 9, 10, 15, 16, 18

[56] References Cited

U.S. PATENT DOCUMENTS

| | | | |
|---|---|---|---|
| 4,316,247 | 2/1982 | Iwamoto | 363/707 |
| 4,317,180 | 2/1982 | Lies | 364/707 |
| 4,381,552 | 4/1983 | Nocilini et al. | 364/900 |
| 4,398,192 | 8/1983 | Moore et al. | 340/825.44 |
| 4,463,440 | 7/1984 | Nishiura et al. | 364/900 |
| 4,479,191 | 10/1984 | Nojima et al. | 364/707 |
| 4,545,030 | 10/1985 | Kitchin | 395/560 |
| 4,698,748 | 10/1987 | Juswik et al. | 364/200 |
| 4,766,567 | 8/1988 | Kato | 364/900 |
| 4,780,843 | 10/1988 | Tietjen | 364/900 |
| 4,809,163 | 2/1989 | Hirosawa et al. | 364/200 |
| 4,823,292 | 4/1989 | Hillion | 364/707 |
| 4,841,440 | 6/1989 | Yonezu et al. | 364/200 |
| 4,963,769 | 10/1990 | Hiltpold et al. | 307/465 |
| 4,968,900 | 11/1990 | Harvey et al. | 307/296.3 |
| 4,980,836 | 12/1990 | Carter et al. | 364/483 |
| 5,025,387 | 6/1991 | Frane | 364/493 |
| 5,041,964 | 8/1991 | Cole et al. | 364/200 |
| 5,083,266 | 1/1992 | Watanabe | 395/275 |
| 5,123,107 | 6/1992 | Mensch, Jr. | 395/800 |
| 5,129,091 | 7/1992 | Yorimoto et al. | 395/750 |
| 5,150,954 | 9/1992 | Hoff | 340/825.44 |
| 5,167,024 | 11/1992 | Smith et al. | 395/375 |
| 5,175,845 | 12/1992 | Little | 395/550 |
| 5,201,059 | 4/1993 | Nguyen | 395/800 |
| 5,218,704 | 6/1993 | Watts, Jr. et al. | 395/750 |
| 5,222,239 | 6/1993 | Rosch | 395/750 |
| 5,247,164 | 9/1993 | Takahashi | 235/492 |
| 5,247,655 | 9/1993 | Khan et al. | 395/550 |
| 5,249,298 | 9/1993 | Bolan et al. | 395/750 |
| 5,481,753 | 1/1996 | Miyake et al. | 710/23 |
| 5,729,204 | 3/1998 | Fackler et al. | 340/825.04 |
| 5,809,263 | 9/1998 | Farmwald et al. | 395/309 |

Primary Examiner—Glenn A. Auve
Assistant Examiner—Ario Etienne
Attorney, Agent, or Firm—Flehr Hohbach Test Albritton & Herbert LLP

[57] ABSTRACT

Structure and method are provided for reducing power consumption in a computer system without sacrificing computer performance or inhibiting a computer user's rapid access to the computer. An identifier, such as a device address, network address, serial number, and the like, is associated with each device or resource. Communications over a communications link such as a parallel bus, serial bus, or wireless link, are monitored by each device to determine device identifiers communicated over the link, and these identifiers are compared to the identifier associated with the monitoring device. Each device monitors the communications and is responsible for self-controlling its operating condition to minimize power consumption. Each device includes a first component which operates continuously to provide the monitoring function, and a second component that operates in a low power consumption mode unless the first component signals the second component that its operation is needed during that time period. Typically, the first component withholds a device operating input, for example a clock signal, from the second component when none of the communicated identifiers match the particular device; and provide the operating input when one matches. In the first component, the number of circuit elements is reduced so that the number of circuit elements which are continuously active are reduced. The structure and method provide very fine temporal control of power consumption in the computer system.

47 Claims, 20 Drawing Sheets

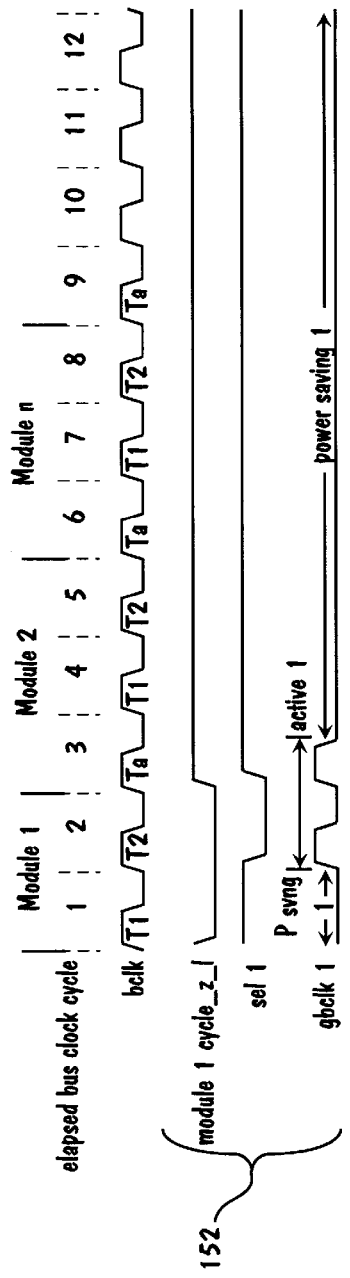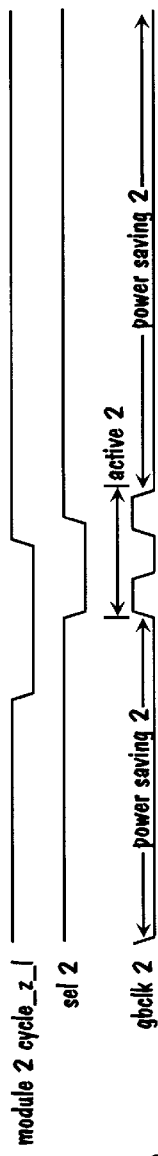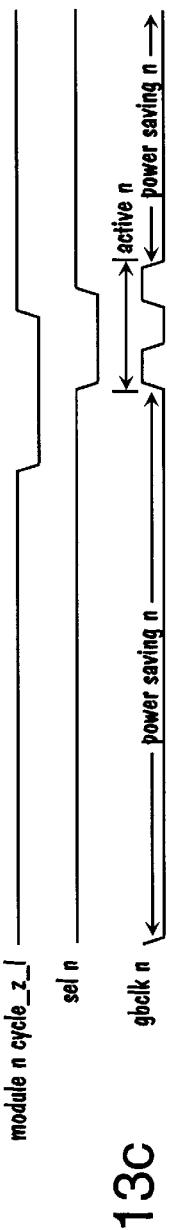
FIG. 13a FIG. 13b FIG. 13c DISTRIBUTED POWER MANAGEMENT TIMING DIAGRAM

DISTRIBUTED POWER MANAGEMENT SYSTEM AND METHOD FOR COMPUTER

FIELD OF THE INVENTION

This invention pertains generally to the field of computer system power management, and more particularly to a distributed power management system and method wherein power management functions are delegated to individual modular subsystems or functional components within the overall computer system.

BACKGROUND OF THE INVENTION

Power management has been, and continues to be, a major concern in the development and implementation of battery powered or battery operated microprocessor based systems, such as laptop computers, notebook computers, palmtop computers, personal data assistants (PDAs), hand-held communication devices, wireless telephones, and any other devices incorporating microprocessors in a battery-powered unit, including units that are occasionally battery powered, but that also operate from a power line (AC) source. The need for power management is particularly acute for battery-operated single-chip microcomputer systems, where the desirability or requirement for overall reduction in physical size (and/or weight) also imposes severe limits on the size and capacity of the battery system, and yet where extending unit operating time without sacrificing performance is a competing requirement. Conventional methods for power managing these types of systems have typically been based on a centralized power management unit architecture.

For example, in an exemplary conventional centralized power management unit 20, such as that illustrated in FIG. 1, an activity monitor 21, monitors accesses to specific system resources, such as access to serial ports 31, parallel ports 32, a display subsystem controller 33, memory controller 34, keyboard controller 35, and like resources. Such activity monitor 21 may be implemented in hardware or software, and in either case may be configured (such as by hard wiring, firmware, or software) to accommodate specification of a particular system resource address range or ranges to be monitored. The centralized power management unit (PMU) passively watches activity on the bus concerning other system resource units. The occurrence of one or more pre-identified addresses or address ranges on address bus 26 is recognized by the activity monitor, which in turn operates to trigger a particular predetermined action, such as to alter the operating state or mode of one or more system devices to affect a change in the power consumption state of the system.

In one conventional power management system, five operating states are provided: ON, DOZE, SLEEP, SUSPEND, and OFF. These names are not uniformly standardized, but each of the DOZE, SLEEP, and SUSPEND modes represents intermediate power consumption states between fully ON and fully OFF. By way of example, under one set of rules, in the ON state, the bus clock may operate at full speed, the LCD display system may be ON, memory may be ON, and the system as a whole may be ON. In the DOZE state, the bus clock may be slowed or stopped, the LCD is ON, memory is ON, and the system is ON. The SLEEP state provides a bus clock which is either slow or stopped, as compared to the full speed bus clock, the liquid crystal display is OFF, memory remains ON, and the system as a whole remains ON and responsive. In the SUSPEND state, the bus clock is typically stopped, the liquid crystal display is OFF, memory is ON, but the system as a whole is OFF. Maintaining memory in the ON state is important for rapid resumption of processing, such as when a keyboard key is struck by a user to reinitiate input processing on the computer system. Finally, in the OFF state, the bus clock is stopped and the subsystem power supply to the LCD, memory, and system are OFF.

Other conventional centralized power management systems may implement more or fewer states or power consumption modes, and such systems may control power delivery to devices and/or modify clock frequency.

Activity masks 22 may also be provided, and, when present, permit control of which of the monitored system resources will generate an activity indicator when accessed. Such activity indicators are used to control transitions of the computer from one state to another, such as, for example, in the context of the exemplary system described above, a transition from SLEEP state to the DOZE state, or the ON state, in response to a user of the computer making a keyboard key entry. When activity masks are implemented, those resources which are to be monitored for activity are unmasked, and those resources which may be ignored and are not monitored are masked. Some implementations provide a unique activity mask for each power management state.

Activity timers 23 may also be provided. The activity timers are typically initialized by software to specify the amount of "idle" time which may be allowed to elapse before moving to the next (typically lower) power consumption state. The value of the idle time may typically vary for each power state or state transition, but tends to be defined as the following order of magnitude timings: a power state transition from ON to DOZE is implemented with a first idle time of between about 1 millisecond ($1 \times 10^{-3}$ seconds) and some small number of seconds, for example, from about 1 to about 30 seconds. The transition from a DOZE state to a SLEEP state is typically implemented with a second idle time of seconds to one or a few minutes. And, the power state transition from SLEEP to SUSPEND state is typically implemented with a third idle time of a few minutes to several minutes. U.S. Pat. No. 5,396,635 herein incorporated by reference, includes a description of one particular power management system which has an activity monitor, and uses activity masks and activity timers.

Note that for a microprocessor operating at 200 MHZ, each clock cycle represents 5.0 nanoseconds ($5 \times 10^{-9}$ sec), and for a system bus operating at a 100 MHZ clock, each clock cycle represents 10 nanoseconds. Furthermore, it is noted that external memory access typically requires 40–60 nanoseconds, while internal memory may operate at the microprocessor clock rate. It is therefore easily appreciated that even the shortest conventional idle period of, for example 1 millisecond, is long compared to a system bus cycle (10 nanoseconds) by a factor of $10^5$.

In conventional computer power management systems, one activity timer, or timer value, is normally allocated per power management state. When unmasked activity is detected, the activity timer is reloaded or reset with the "time out" timing value programmed by software. Then, when the activity timer for a particular power management state expires, either an interrupt is generated to allow software to control the transition to the next power management state, or the transition occurs automatically by hardware control.

Transition from a lower power consumption state to higher power consumption state may occur relatively more quickly. For example, the operating state may transition directly from the SUSPEND state upon detection of a single keyboard key entry to the ON state, or such change may require a plurality of events for such transition to occur.

With further reference to FIG. 1, the power state block 24 controls the system power management state and interfaces to the clock control logic 25. Clock control logic block 25 receives a clock input signal (clock_in) at a first clock frequency ($f_1$) and controls the state of the output bus clock. Clock control 25 may pass the clock_in signal through, may slow the clock to a lower frequency ($f_2$), or may stop the bus clock for the entire system during certain low power consumption power management states. State transitions can be initiated by software, or can occur automatically in hardware when an activity timer expires.

Centralized power management architecture, such as that exemplified by the system in FIG. 1, has the disadvantage that, when the system is operating in a reduced power consumption state, an access to any unmasked system resource typically causes an exit (state transition) from that reduced power state to a higher power consumption state, and, in the worst case, it transitions to a full "ON" state independent of the access required. This transition may occur for all system resources independent of any actual requirement for participation by that resource at that time. Furthermore, since, in conventional systems, the finest timer resolution is typically controlled by the preset or programmed "idle" times which are measured and/or implemented in the millisecond or longer ranges, the computer system may need to wait unnecessarily to return to a lower power consumption or power saving state, even when access to a system resource is no longer required, or the required access cannot be made during a particular time interval due to multitasking constraints.

A further disadvantage from such conventional systems, is that system resource components receiving the bus clock continue to receive the bus clock signals at all times independent of any actual access to that resource, and that such signals are propagated to each and every component of the system. Because several hundred or several thousand gates are dynamically switching in response to the bus clock triggered transitions, independent of the actual access by the system of the resource, substantial power is consumed unnecessarily. This switching loss is particularly disadvantageous in current CMOS-based implementations where static operation has a much lower power consumption than dynamically switched operations.

Even for systems that may stop the bus clock propagation to certain devices during a very power conservative state (e.g. SUSPEND), propagation is typically either completely enabled or completely disabled, and when enabled, the clock propagates to all portions and circuits of each system resource without regard for functionality.

A further disadvantage of conventional systems which results in increased power consumption, pertains to the structure of the bus-to-device-interface interposed between a system bus and a particular system component.

A further disadvantage of conventional systems, particularly for software-based power management, is the delay associated with initiating access to a device which has been placed in a lower power consumption state. Once a device is placed in a reduced power consumption state, significant time delays (for example, delays on the order of tens of hundreds of micro seconds ($10^{-6}$ seconds) may be required to reconfigure the device for access.

SUMMARY OF THE INVENTION

Structure and method are provided for controlling and thereby reducing power consumption in a computer system having a bus and at least one device coupled to the bus without sacrificing computer performance or inhibiting a computer user's rapid access to the computer. A unique identifier is associated with each device or resource associated with the computer, such as for example, memory, keyboard controller, mouse controller, input/output ports, and any other computer resource or peripheral. This unique identifier may typically be a device address or other device identifier such as a device serial number, network device address, and the like. Communications over a communications link such as a system or other parallel bus, serial bus, or wireless link, are monitored by each device for a predetermined time period to determine device identifiers communicated over communications link during that time period, and these identifiers (e.g. device addresses) are compared to the particular unique identifier associated or allocated to the monitoring device. Each device monitors the communications activity and is responsible for self-controlling its operating condition to minimize power consumption. Each device includes a first component which operates continuously so as to provide the monitoring functionality and a second component that operates in a low power consumption mode unless first component signals the second component that its operation is needed during that time period. The first component withholds a device operating input from the second component when none of the communicated identifiers match the particular device; and provide the device operating input to the second component when one of said communicated device identifiers match that particular device. The number of circuit components is reduced to a minimum in the first component so that the number of circuit elements which are continuously active are reduced. In one embodiment of the invention, the device operating input is a clock signal operating at the bus clock frequency. Power consumption is reduced due to the reduction in the number of circuits which are actively clocked. The inventive structure and method provide very fine temporal control of power consumption in the computer system.

BRIEF DESCRIPTION OF THE DRAWINGS

FIG. 6 is a diagrammatic illustration of an exemplary subsystem for DRAM memory used with a display controller and the relationship between the bus interface, core logic, graphic port interface, I/O buffers and the like.

FIGS. 13a–c is an exemplary timing diagram for the distributed power management system showing the manner in which power is saved for each inactive subsystem and periods during which clock is gated to an active subsystem.

FIG. 15b is an exemplary timing diagram showing performance of a distributed power management system of the present invention during the same multitasking processing session as illustrated in FIG. 15a.

DETAILED DESCRIPTION OF THE INVENTION

Figure 1:
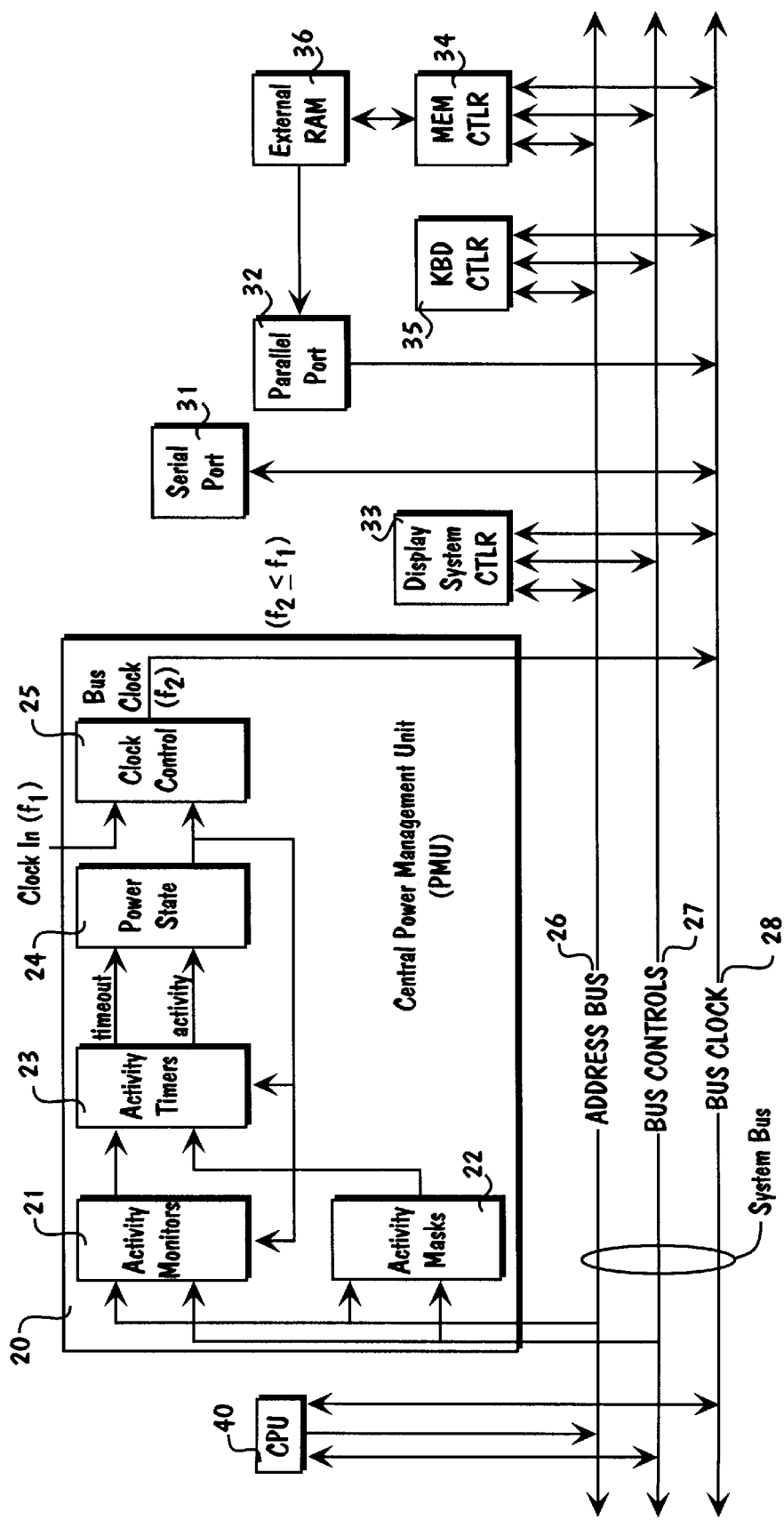
FIG. 1 is a diagrammatic representation of portions of a conventional centralized power management system.
Figure 2:
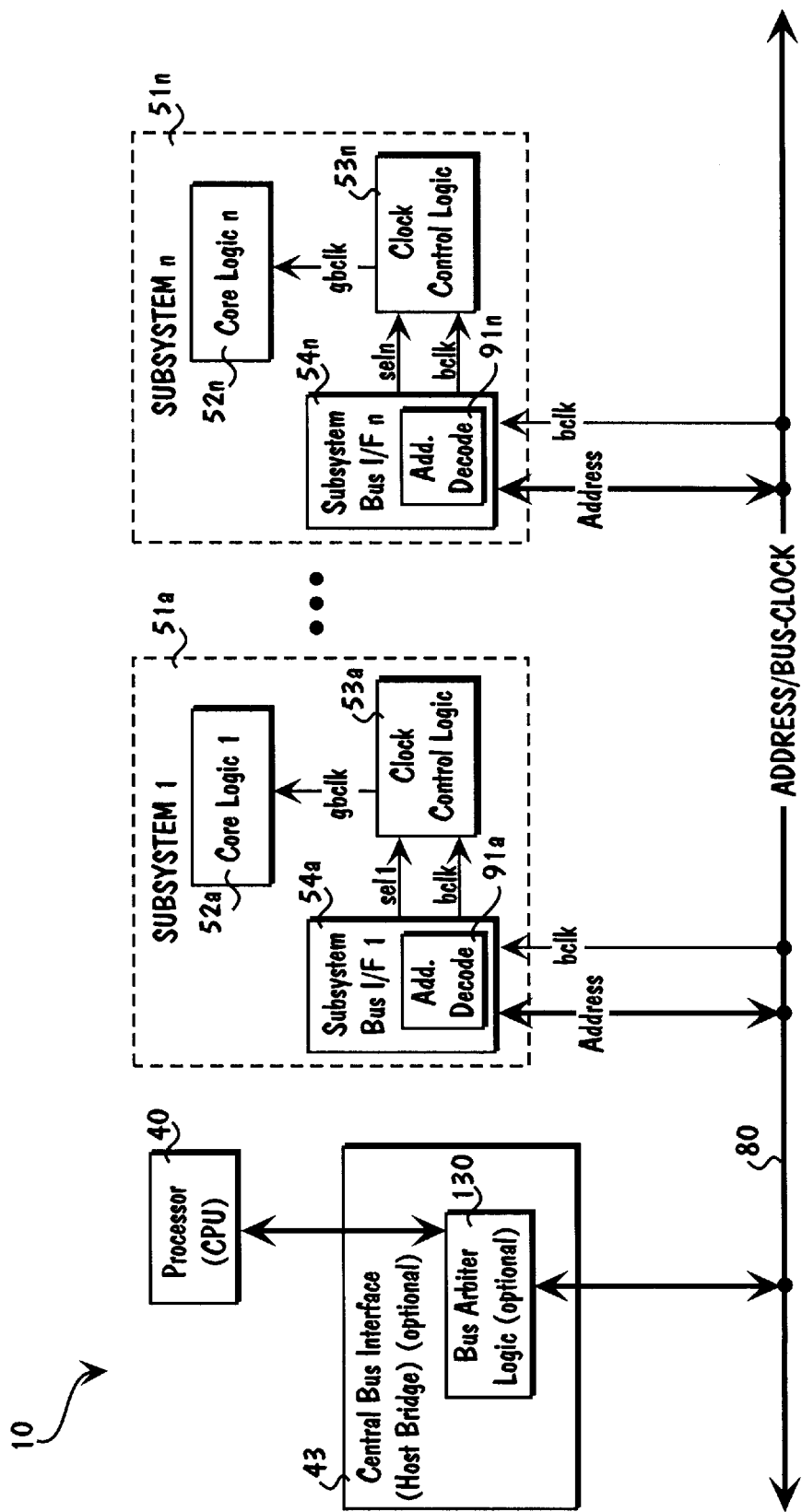
FIG. 2 is a diagrammatic representation of a first embodiment of a computer system implementing a distributed power management system according to the present invention.

The inventive distributed power management system (DPMS) and method (DPMM) is now described with respect to the exemplary implementation of a computer system 10 in FIG. 2. A host processor, microprocessor, or central processing unit (CPU) 40 (such as made by Intel, Advanced Micro Devices, Cyrix, Motorola, Apple Computer, for example) is coupled to the other system components via central or main system bus 80 which propagates control and data signals including bus clock signals (bclk) and address signals (add). An optional host CPU-to-central bus interface 43 (referred to as a host bridge) may also be provided to accept signals from CPU 40 over a host bus 41, and translate, reformat, adjust timing, or the like processing of these signals, prior to placing them on the system bus 80 (See FIG. 3 for additional details). Such bus interface 43 may optionally but advantageously be provided as a bridge circuit so that CPU 40 may be modified or replaced by alternative designs without requiring redesign of the peripheral circuits or subsystem modules, that is of subsystem 1, . . . , n. This advantageously allows modular system design and implementation and easier and lower cost upgrade path. However, neither the host bridge 43 nor the bus arbiter logic 130 within the bridge are required to realize the fundamental advantages of the DPMS and DPMM. Examples of modular architecture incorporating a central bus interface 43 and a plurality of connected modular subsystems is described subsequently in this disclosure. Note that recognition of the address occurs by the receiving subsystem which itself, independent of the CPU or other centralized power management unit, then initiates responsive action.

In simplest terms, processor 40 places device (subsystem) address and bus clock signals on central bus 80. Each subsystem 51a, . . . , 51n includes an address monitor/decoder unit 91a, . . . , 91n, which is connected to receive device (e.g. subsystem) addresses communicated over the bus 80 and decode them. When a received and decoded address identifies a device associated with or controlled by the particular addressed subsystem (e.g. subsystem 51a), the subsystem bus interface 54a generates a subsystem select signal (sel_1) which it communicates to clock control logic 53a within the subsystem along with the bus clock signal (bclk). Subsystem interface 54a and clock control logic 53a desiredly have only a minimum number of logic elements since they are continuously active; core logic 52a contains the circuitry that actually performs the desired function and receives no clock unless actually accessed.

In a simple implementation, clock control logic 53a is merely a logical "AND" gate that receives the bus clock signal and subsystem select signal and passes or gates the bus clock signal (bclk) from subsystem bus interface 54a to core logic 52a when the subsystem select signal (seln) is enabled. Other more complex clock control logic implementations are described hereinafter that provide additional features and functionality. The bus clock signal may alternatively be provided directly to the clock control logic circuitry without passing through the subsystem bus interface 54a. It should be noted that both the subsystem bus interface 54a, . . . , 54n, and the core logic 52a, . . . , 52n, will typically be different for each subsystem unless duplicate subsystems are provided, and even in such instances each will have different assigned addresses. Furthermore, for the sake of simplicity of description, and so as not to obscure the invention, various data and/or control signals of conventional type and apparent to those workers having ordinary skill in the art are not shown or described in the embodiments of FIGS. 2 or 3. Exemplary configuration and structures for subsystems are described hereinafter in connection with preferred embodiments of the invention.

Figure 3:
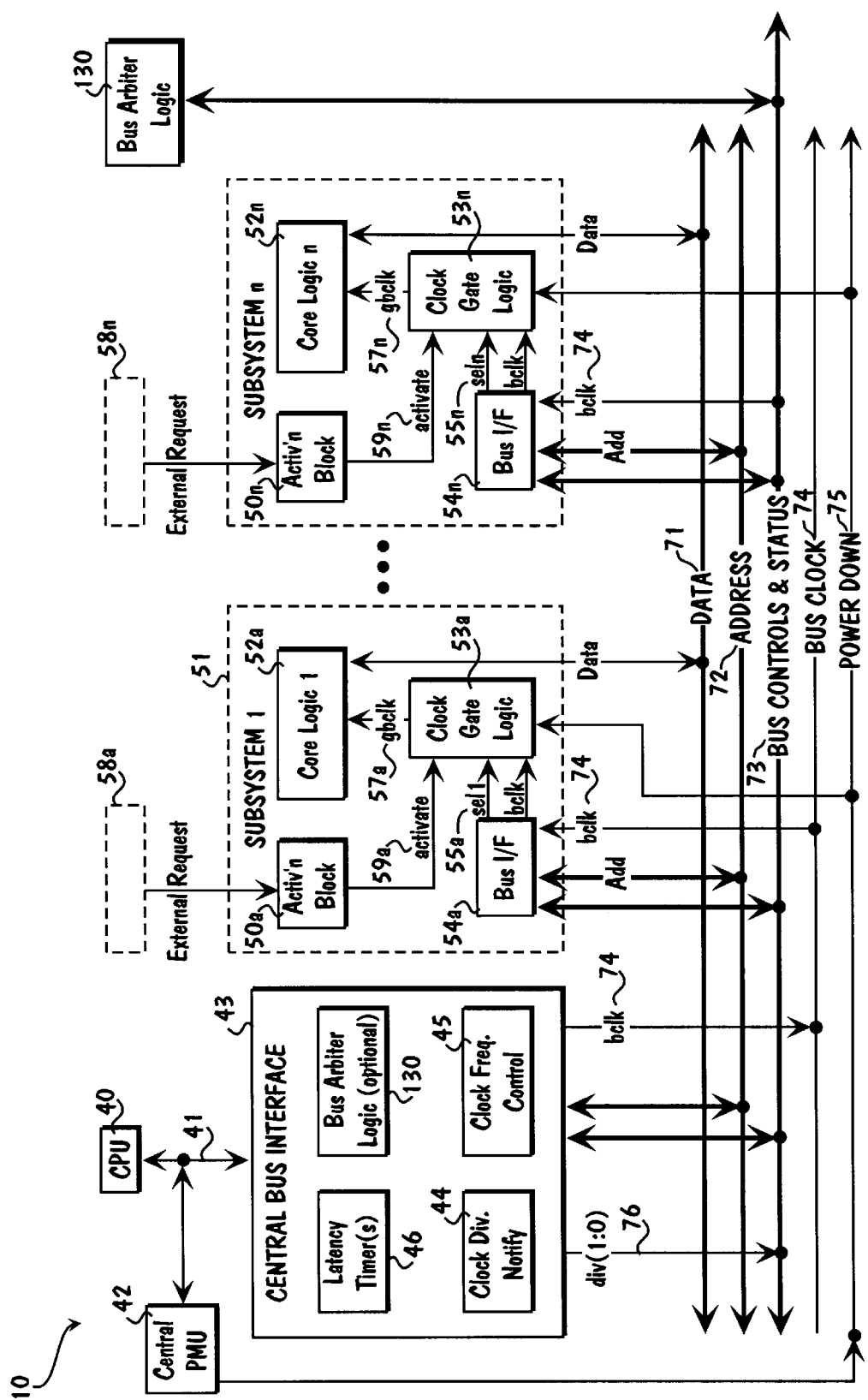
FIG. 3 is a diagrammatic representation of a second embodiment of a computer system implementing a distributed power management system according to the present invention and providing additional features.

A second embodiment of the inventive power management system and method is shown in FIG. 3, which includes additional features or enhancements beyond those shown and described relative to the FIG. 2 embodiment. The overall power management of the computer system 10 may optionally, but advantageously, also include a centralized power management unit 42 of conventional type. This embodiment also includes a central bus interface 43 having bus clock frequency control circuitry 45 and bus clock frequency change notification circuitry 44, the later two being useful to provide an overall decrease in power consumption as a result of slower switch frequency and fewer switch transitions, and to assist in the maintenance of any real time clocks, which may be present in certain of the subsystems 51c, . . . , 51n.

As used herein, the term "subsystem" means any circuit, device, component subsystems, or the like, that interfaces to the other computer system circuits, devices, system resources or components. Subsystems include but are not limited to for example, memory and memory controllers, display controllers and devices, processors, keyboard controller, mass storage devices, printer, scanner, video devices, CD ROMs, PC cards, modems, serial and parallel ports, and other input/output devices without limitation.

The DPMS delegates power management functions to each computer subsystem, and, in some implementations, to a bridge circuit in the Central Bus Interface 43, that forms a part of the component. Particular embodiments of the invention that include one or more "bridge" circuits to increase modularity of the computer system.

Advantageously, the microcomputer is a single-chip microcomputer wherein the busses communicating address data and control information (e.g. central bus 80) are formed and contained entirely on the common substrate of a single chip. Such an "internal bus" implementation is not pin-limited, and therefore multiplexing and/or de-multiplexing of signals (address, data, control, and the like) is not required. However, those having ordinary skill in the art in light of the disclosure contained herein, will appreciate that the inventive distributed power management system and method may be implemented for an "external bus" architecture wherein some signals, pins, or busses may require multiplexing and de-multiplexing so that excessive pin connections are avoided. It is noted that the Peripheral Component Interconnect Bus (PCI) is a pin-limited, external bus architecture, which requires multiplexing and de-multiplexing of signals at the interface, to which the inventive distributed power management system can be applied.

The inventive DPMS limits the amount of logic circuitry provided in each subsystem module so that power consumption by such logic circuitry is kept at a minimum level. For a computer system implemented with one, or with multiple, subsystem modules connected to an internal bus, such as subsystem 1, subsystem 2, . . . , subsystem n as shown in the embodiment of FIG. 3, a predetermined set of signals facilitates implementation of the distributed power management system and method. Other signals shown in FIG. 3, are not required and are optional, but are advantageously provided to implement additional system capabilities and power saving features.

As illustrated in FIG. 3, the bus interface logic 54a, . . . , 54n of each subsystem module, runs off the bus clock signal (bclk) 74 which is generated by central bus interface block 43 and routinely derived from the CPU processor clock signal, albeit at a slower rate than the CPU clock, and each of the bus interface logic units 54n, continuously monitors activity, such as the occurrence of an address identified to that particular subsystem on address bus 72. During each bus access cycle, a particular subsystem module (referred to here as the current bus master), after having requested and been granted access to the central bus during that time period, drives valid address and command and control signals onto the address bus 72, control and status bus 73, which may be a common central system bus. The command and control may include status information such as the div(1:0) information.

When a subsystem module detects that a particular bus cycle requires access to resources within, or controlled by, that subsystem module, it asserts its subsystem module-select signal (seln identifying module "n") which in turn enables the clock gate logic 53n so that the gated clock signal (gbclk) passes to the core logic 52n of the subsystem module 51n, to which access is required.

For example, if access to resources within, or controlled by, subsystem 1 are required as indicated by detection of the address identifying that subsystem 1, the bus interface within subsystem 1 asserts its module-select signal (sel 1) to enable the clock gate logic 53 and provide gated clock signal (gbclk) to core logic 1, thereby causing core logic 1 to respond to the gated clock signal and commence operation and to effectively exit from its power consumption saving state or mode. After the bus cycle has finished, and access to that particular subsystem has completed for that particular bus cycle, the subsystem deasserts the select signal so that gated bus clock (gbclk) 57 is stopped, and the core logic component 52 of the subsystem then reenters its power saving mode. Note that power savings is achieved at the bus cycle level and that no formal status or mode transitions, such as might be controlled by a state machine, are involved or required. Of course those workers having ordinary skill in the art in light of the description contained herein will appreciate that the clock control logic may be implemented so that the gated clock signal is stopped or passed in response to either assertion or deassertion of the select signal, and that either logical high or logical low state may be used. The details of the clock gate circuit provides for glitch-free clock switching by using two stages of flip-flops that operate at both edges of the clock.

It should be noted that only the bus interface circuitry 54a, . . . , 54n and the clock gate logic 53 within each subsystem receives the ungated bus clock signal bclk 74, and that the core logic 52n does not receive the bus clock until selected. It is further noted that the bus interface 54n is advantageously implemented with a minimum number of gates so that only the minimum number of circuits, including logic gates, latches, flip-flops, and the like, receive clock signal and transition dynamically. Various embodiments of bus interface 54n are described in greater detail hereinafter.

The subsystem modules may also be connected to various external resources 58n which may require operation of the particular core logic 52n independent of activity on the bus 72. Such external resources may, for example, include communication interfaces such as modem interface (I/F) or RS232, or direct memory access peripherals (DMA) such as floppy disk controllers, or other external resources which generate asynchronous interrupts to the CPU to request service.

For subsystem modules having such external connectivity, receipt of an external request signal from the external resources 58n will result in generation of the activate signal 59n by an optional subsystem activation block 50n. In such implementations, circuitry is provided within the clock gate logic 53n to enable the clock gate logic and allow the gated bus clock signal 57n to reach the respective core logic 52n when externally activated. When the external request has completed, activate signal 59n is deasserted and provision of the gated bus clock (gbclk) to the core logic 52 is stopped or disabled.

The structure and process by which bus interface 54n recognizes various addresses and controls generation of the particular select signal 55n to the clock gate logic 53n is now described.

Figure 4:
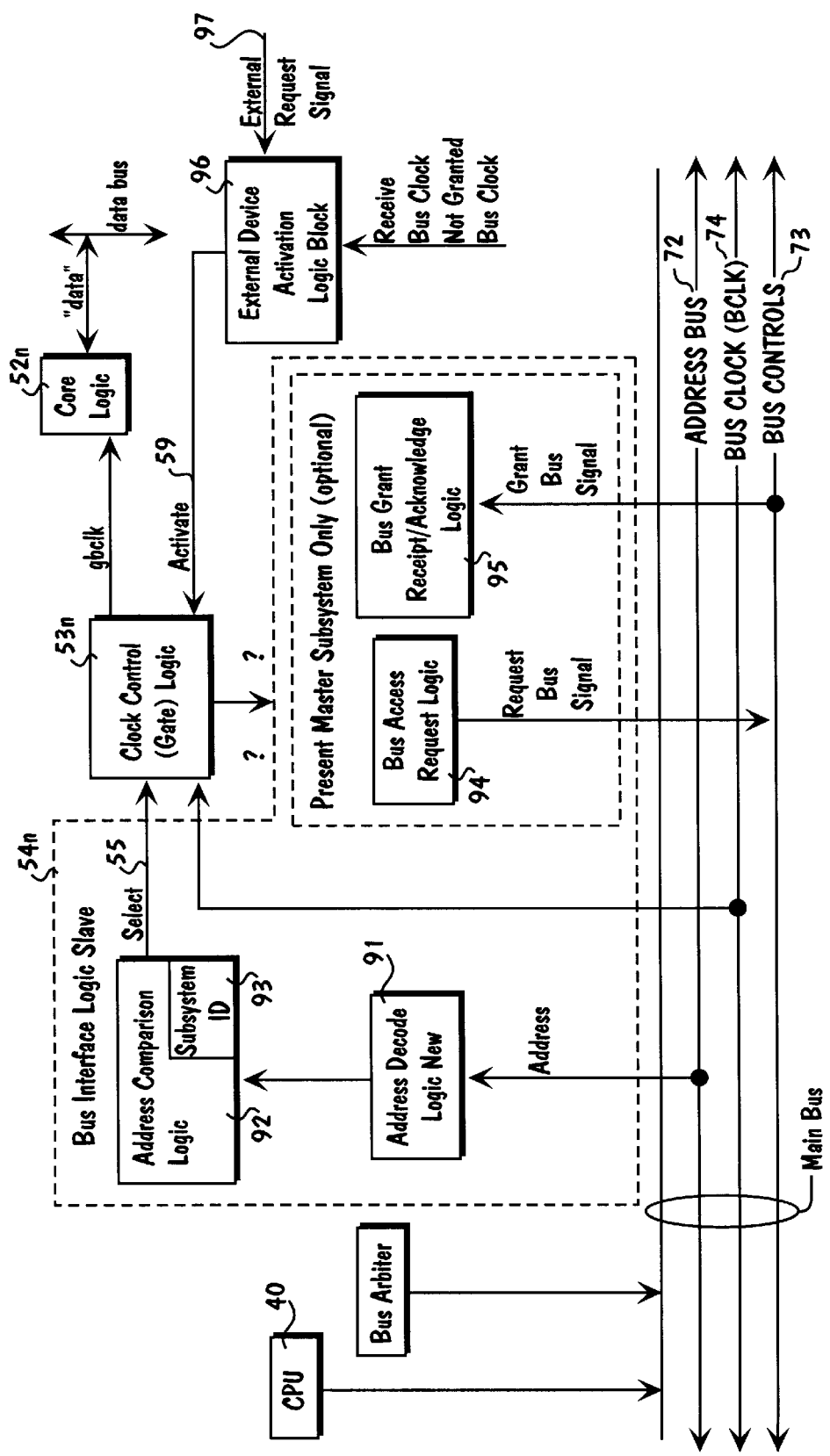
FIG. 4 is a diagrammatic representation of an exemplary subsystem bus interface logic block according to the invention.

The structure and operation of a particular exemplary embodiment bus interface logic block 54n is now described relative to FIG. 4. In the simple embodiment earlier illustrated and described with respect to FIG. 2, the subsystem bus interface 54 was shown configured to receive address information and bus clock information from the central system bus 80, and to generate a sel_n signal (where "n" designate the subsystem unit selected), and communicate that sel_n signal to clock control logic 53. Furthermore, subsystem bus interface 54 received the bus clock signal 74 and communicated that bus signal to the clock control logic circuit 53.

An address decode logic block 91 is coupled to receive address information from the address bus 72 portion of the main bus, and to decode that address information in a conventional manner. For example, address decode logic 91 may include combinational logic, equality comparators and flip-flops. The decoded address is communicated to an address comparison logic block 92 which either stores a particular unique subsystem address or other identification 93, or receives that subsystem address identification from an external source. When the decoded address compares to, that it matches the stored subsystem address, bus interface logic 54 identifies the received address as matching the address of that particular bus interface unit. Of course, each subsystem n will have a different unique address. The select signal 55 is then communicated along with the bus clock signal to clock control or gate logic 53*n*. This clock control or gate logic 53*n* passes the gated bus clock signal to core logic 52*n*, thereby enabling operation of the core logic 52*n* as described elsewhere in this specification. Data paths to and from core logic 52*n*, are of conventional type and are not described further. In fact the inventive distributed power management structure and method are data and data path independent.

The address decode logic 91, address comparison logic 92, subsystem ID 93, and the select and bus clock signals are provided in the bus interface logic of both "slave" subsystems and "master" subsystems. However, in master subsystems, that is those subsystems which can initiate a request for bus access and receive a bus grant receipt or acknowledgment from the bus granting that particular subsystem authority to receive and/or transmit data or other information on the bus, a bus access request logic block 94, and bus grant receipt or acknowledgment 95 are also required. These two logic blocks are illustrated as optional components in FIG. 4 and transmit and receive request bus signals (REQ_n) and grant (GNT_n) bus signals respectively from a bus control or arbiter portion of the central system bus. Master subsystem configurations may generally be advantageous for devices such as Direct Memory Access Controllers (DMAC) which can transfer data from memory subsystems to I/O subsystems and visa versa without CPU intervention, high speed communication subsystems such as 4 Mbit Irda Controllers or USB controllers. Master subsystems are advantageously provided in an operations computer system, but are not required to implement distributed power management and conservation features.

An optional external device activation logic block 95, generally provided external to the bus interface logic 54, and which receives a request signal from an external device (such as for example, a DMA request input) and generates an activate signal which it communicates to clock Control Gate Logic 53 in order to control the gated bus clock signal (gbclk). One may also generate or otherwise provide an "activate" signal to clock control logic 53 to cause the clock control logic circuit to enable the gated bus clock to the core logic 52*n*.

This distributed power management system and method operates independently of any central power management process or control that may also optionally be provided, but may also be overridden by optional "power down" command, "power up" command, or other such control signal(s) as may be issued by central power management unit 42, CPU, or by other hardware or software derived control signal. In the embodiment illustrated in FIG. 5, the aforementioned power down command is input directly to the clock gate logic 53 and causes the gated bus clock (gbclk) that might otherwise be provided to core logic 52 to stop. It should be noted that in this particular embodiment, the power down command signal does not withhold operating power, such as transistor bias voltages, $V_{CC}$ voltage, or the like, but rather stops communication of the bus clock signal to the respective core logic elements so that power consumed by switching is reduced. However, those workers having ordinary skill in the art will appreciate that this distributed power management system and method may be extended to provide additional power conservation features on a subsystem by subsystem basis. Selection of one or more subsystem modules may alternatively be accomplished by control other than address monitoring.

The inventive distributed power management system (DPMS) and method (DPMM) provides power management with high temporal resolution so that power consumption is significantly reduced even during normal full-speed operation of the system. It also provides extremely rapid "transition" of devices (e.g. subsystem modules) from a non-operational power conserve state to a fully operational state. For example, transitions may occur as quickly as within about 10 nanoseconds for a 50 mhz bus clock signal. It provides this power saving by enabling communication of the bus clock, or clock signals internal to the unit derived from the bus clock, only to the subsystem or subsystems which are actually being used during that bus cycle. In an architecture having a common bus structure that couples the CPU with each of the subsystems, such as that illustrated in the embodiments of FIGS. 2 and 3, only two of the subsystems can generally be active at the same time, that is, either providing or receiving information over the common bus during the same bus cycle. The remaining subsystems may therefore operate in a power saving mode during that bus cycle. Such power saving operation is not achievable with any other known conventional central power management system or method, including any hardware or software based system or method which may power manage by controlling the direction of operating power (e.g. circuit bias voltage or current) or clock signal to any one or more devices.

While conventional central power management systems and methods may provide some level of power conservation when the system is inactive, when certain resources of the system are inactive, or when the system is partially active, such central power management systems do not reduce power consumption when the system is operating in its normal mode or state. In most such systems, normal mode or state comprises maximum possible processor and peripheral bus clock speeds, display on, disc drive controller active and disc spinning, and the like. By comparison, the inventive distributed power management system and method provides a deeper level of power saving, including all of the benefits of the aforementioned conventional forms of power conservation when the system is inactive, when certain of the resources are inactive, and when the system is partially active, and further provides significant reduction of power consumption when the system is operating in its normal mode or state. The manner which these significant further reductions of power are achieved are described hereinafter. For example operation is described relative to the distributed power management timing diagram in FIG. 13, relative to the multi-tasking timing diagrams in FIGS. 14 and 15, and relative to the flow-chart diagram of FIG. 16.

Figure 5:
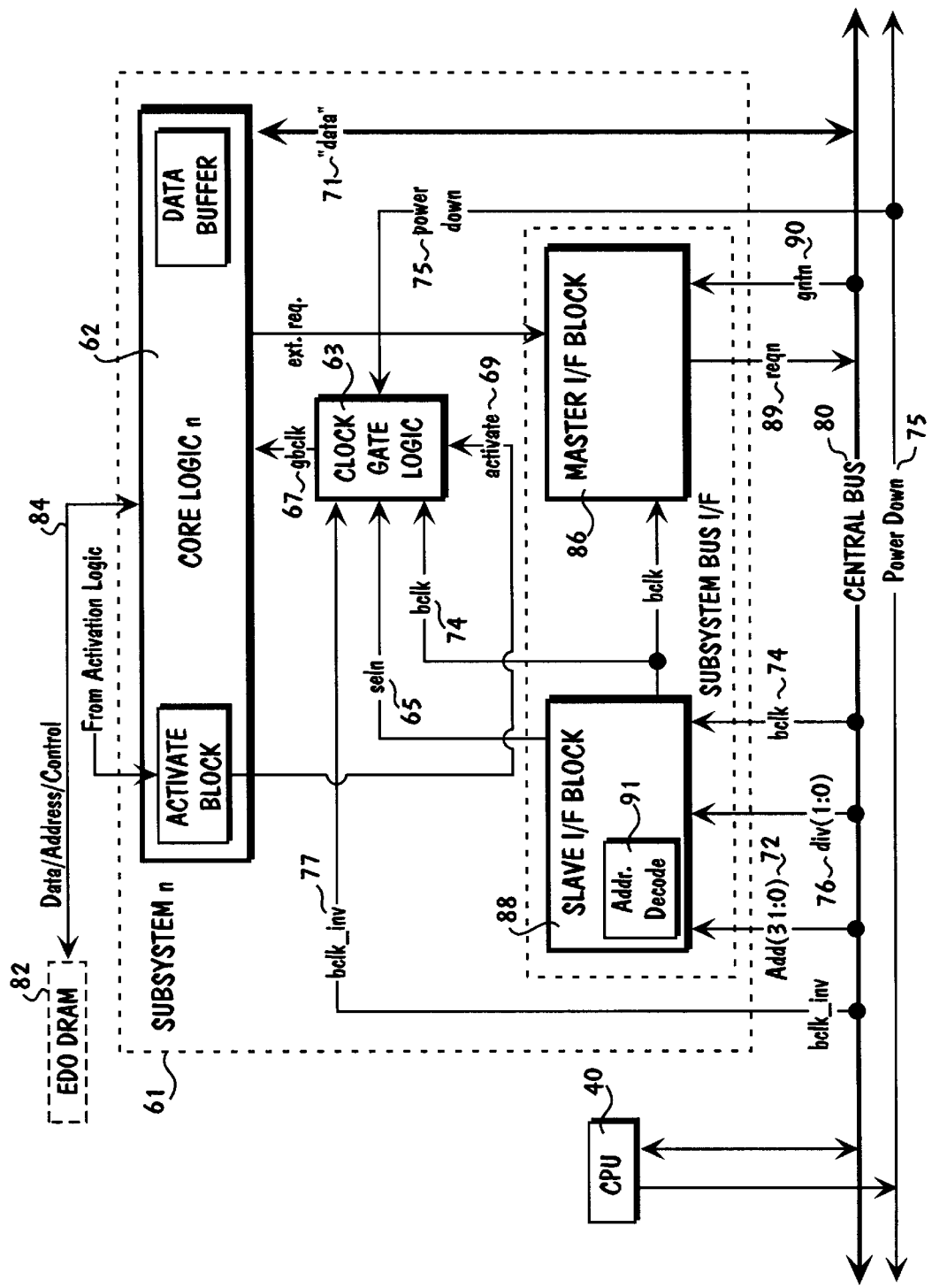
FIG. 5 is a diagrammatic illustration of an exemplary subsystem of the computer system illustrated in FIGS. 2 and 3.

An exemplary subsystem n is now described relative to FIG. 5. For the sake of simplicity, data bus 71, address bus 72 and bus control 73, as well as bus clock 74, are all shown as a single central bus 80 in FIG. 5. Power down signal 75 shown as a separate line in FIG. 5 could also be communicated over the common bus.

The inventive power management system and method may be implemented with any bus architecture including bus architectures having some or all of following characteristics: address bus; data bus, (multiplexed or non-multiplexed); control signals, such as (data flow control) and commands; timing signals, such as: bus clock, and bus access arbitration signals. Each subsystem or module interfacing to the bus should be compatible with the particular bus characteristics in conventional manner. For example, if the bus includes an N-bit address bus, then each subsystem module should be able to decode N bits or at least a sufficient number of those bits to determine whether the N-bit address propagated over the bus is identified to that particular module. An additional requirement is that the subsystem module must know when it is being addressed so it can be enabled and begin gating the bus clock to the core logic associated with that subsystem module. This later request is requested by the subsystem rather than the bus architecture itself.

In the exemplary subsystem module n shown in FIG. 5, the core logic n is shown controlling EDO DRAM 82 so that data, address, and/or control signals 84 may be communicated between the EDO DRAM 82 and core logic 62. Those workers having ordinary skill in the art will realize in light of the description provided herein, that the core logic may itself include EDO DRAM functionality and/or other functionality required or typically associated with operation of a computer system, and that such description here is not limited to subsystems including or controlling such EDO DRAM. EDO RAM is an external device controlled by subsystem n in FIG. 5. Each subsystem n may be either a "slave subsystem module" or a "master subsystem module" as described herein before. A "master subsystem module" is capable of requesting bus access via a request bus signal (req_n) 89, and of receiving a grant bus (gnt_n) signal 90 from the system. A "slave subsystem module" may not request or be granted bus access, but merely responds to such requests by other master subsystem modules. A master subsystem module may desirably be provided where external requests for the core logic are to be provided. The CPU 40 is effectively operates on a master subsystem in the context of this invention. It requests and is granted bus access, and where present is generally subject to bus arbitration rules. Where desired, the CPU may be subject to different bus priorities than other subsystem modules, particularly if there are a relatively large number of other subsystems.

Each master subsystem module 61, comprises both master interface block 86 and slave interface block 88, but a slave subsystem module does not include the optional master interface block 86. In any event, each of these master and slave interface blocks implement a minimum layer of logic to monitor addresses communicated over the bus during each bus cycle, or to initiate a request during a bus cycle in the case of a master interface block. By minimum layer of logic, we mean the smallest (or an optimally small) number of circuit elements (e.g. gates) so that operating this interface block continuously by providing operating power and bus clock signals does not result in excessive power consumption. For example, an interface layer for a slave module device may typically include about 50 gates and will not include the write/read buffers and the data phase of the cycle, which is typically included in conventional interfaces providing the same functionality, but without the inventive power conservation features. Such conventional interfaces may typically include about 1200 gates and consume a proportionately larger amount of power due to the larger number of clocked gates. Where required for operation of the particular subsystem, write buffers or read-ahead buffers are part of the core logic 62, and only consume significant power when the gated bus clock is active in the core logic.

Each slave interface block 88 includes an address decode portion 91 which receives addresses 72 communicated over central bus 80, and makes a determination whether such received address identifies that particular subsystem. If that subsystem is identified for access, slave interface block 88 includes circuitry to generate or enable a subsystem select signal 65, which is communicated to control gate logic 63. As described elsewhere in this specification, control gate logic 63 processes both the select signal 65 and bus clock 74 signal to provide the gated clock signal 67 which is to core logic 62. Alternatively, the activate logic block (See, for example, FIG. 5) may generate an activate signal 69 either as a result of an external request, for example by a refresh request signal (REFREQ) or a liquid crystal display (LCD) request, which also results in generation of a gated clock signal to core logic 62 (See, for example, FIG. 6).

Figure 6:
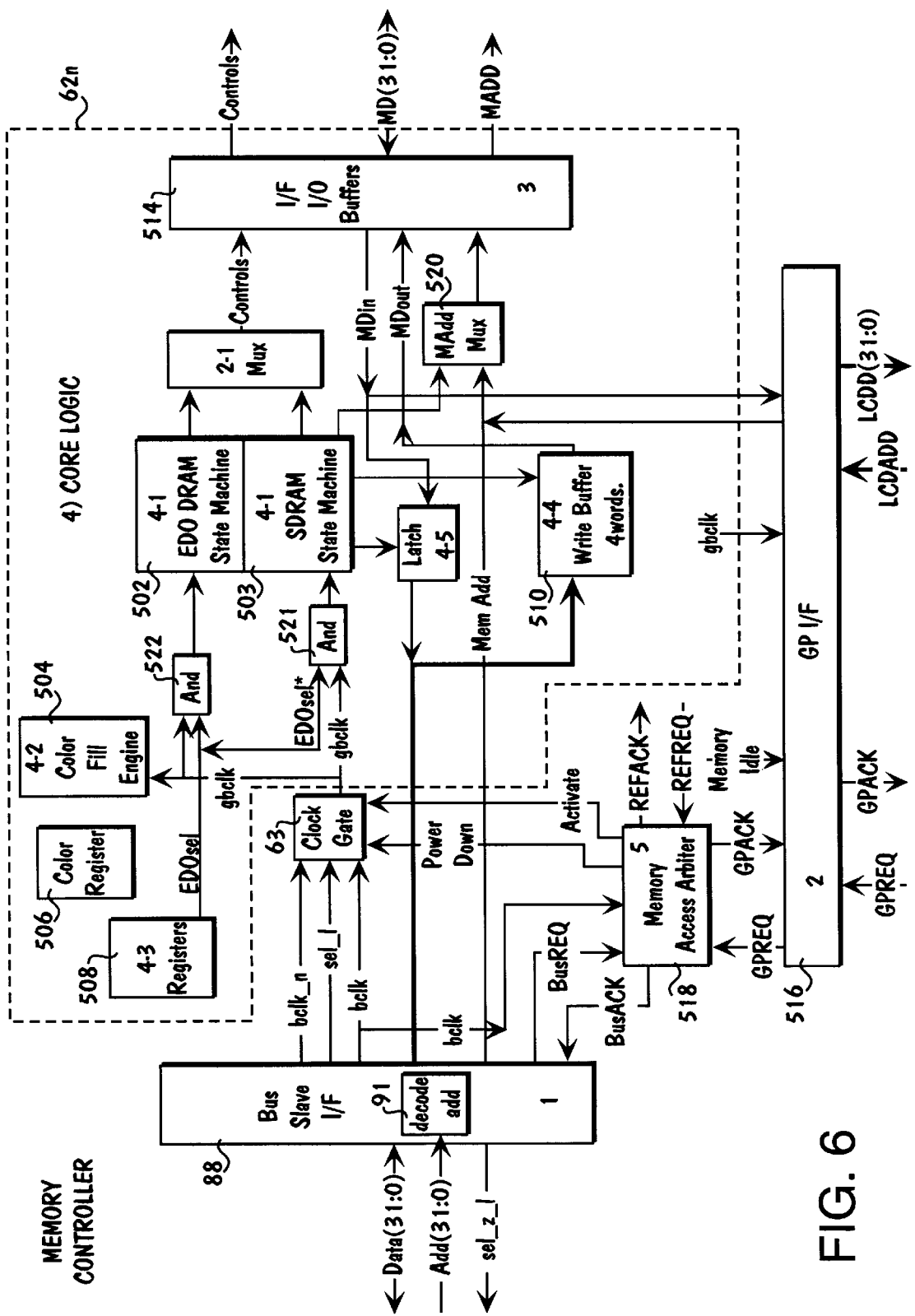

An alternative embodiment of the invention is now described relative to FIG. 6 which provides an exemplary function block diagram of a slave interface block 88 receiving an address (Add(31:0)) which is decoded by address decoder logic block 91. The Slave interface 88 provides bus clock signal (bclk) and a selection signal (sel_1) to the clock gate logic 63. Depending on the state of the selection line, and optionally on the states of the activate and/or power down signal lines, the bus clock is gated to core logic 62 in the manner already described relative to the embodiment in FIG. 5.

Here, the core logic 62 is an EDO DRAM and synchronous DRAM controller (SDRAM) and includes primary functional blocks as follows: EDO DRAM State machine 502, SDRAM state machine 503, color block fill engine 504, color registers 506, registers 508, write buffers 510, a memory data input latch 512, and a Memory Address Multiplexer 520. Core logic 62 also interfaces to an external DRAM interface 514. A Graphic Port interface 516 also operates off of the gated bus clock. This interface receives Graphic Port Request (GPREQ), acknowledgment (GPACK), and LCD addresses (LCDADD) and data (LCDD (31:0)). A memory access arbiter 518 generates an activate signal upon receiving a DRAM refresh request signal (REFREQ) or a graphic port request signal (GPREQ). The memory access arbiter 518 is an example of an external activation logic block 50 already described relative to the embodiment in FIG. 5. Operation of the EDO memory, Graphic Port Buffers, and the like, are conventional and not described further. Note, however, that the gated clock is propagated to and from the clock gate logic 63 to several AND gates 521, 522 which also receive the EDO select signal (EDOSEL) to control clock propagation to the two state machines and to the color fill engine. Where continuous propagation of the bus clock to a component of core logic is desirable, it may be so propagated albeit with some additional power consumption penalty.

The exemplary system already described relative to FIG. 3 also illustrated the manner in which the optional central bus interface 43 provides an optional clock frequency control block 44 to modify clock frequency, and clock division notify block 45. These two components are further options, even if a central bus interface is provided for other reasons. Clock frequency control block 44 provides circuitry for modifying the frequency of the bus clock, for example, for reducing the bus clock frequency by a selected predetermined divisor or factor (div). For example, if the bus clock nominally operates at a 100 Mhz frequency, the clock frequency control block may reduce the clock frequency by dividing by a factor such as 2, 3, 4, . . . , or m, to provide a reduced frequency bus clock signal, for example reduced from 100 Mhz to 50 mhz, 33 mhz, 25 mhz, . . . on 100/m Mhz. Clock frequency reduction is beneficial for reducing power consumption of the system as a whole, and of reducing power consumption within any active subsystem. However, such clock frequency control by itself does not provide the advantages of the inventive system and method and the inventive system and method continues to provide power conservation even when operating at a reduced clock frequency.

To the extent that some subsystems may require maintenance of real-time clocks or functionality, the inventive system optionally but advantageously provides a clock division or clock frequency notification circuit 45 which communicates the frequency reduction or multiplication factor (div) from the notification block 45 within central bus interface 43 via a communication channel (either over the bus or via a separate wired connection) to each of the subsystem bus interfaces 54n.

As shown in FIG. 5, a "div (1:0)" signal 76 having two bits is provided from the central bus and received by slave interface block 88. This divisor signal may then be used either within clock gate logic 63 or directly by core logic 62 to maintain a real-time clock or other circuitry which must operate at a fixed (constant) frequency such as for a display subsystem which must continue to transmit data to the display at a fixed rate, for example 60 Hz. For these subsystems, the divisor signal acts as a notification that the frequency of bclk has changed, and by what factor. The subsystems may in turn modify their own internal clock divider circuits to adjust to the new bclk frequency. Consider, for example, a fixed frequency timer which generates an interrupt for system software to perform task switching or other related functions. If this timer must generate an interrupt every one millisecond and the nominal operating frequency of bclk is 100 MHz, then the circuitry generating the interrupt must include a clock divider which divides bclk by a factor of 100,000, when bclk is operated at 100 MHz, and divides it by a factor of 25,000 when bclk is operated at 25 MHz.

Figure 7:
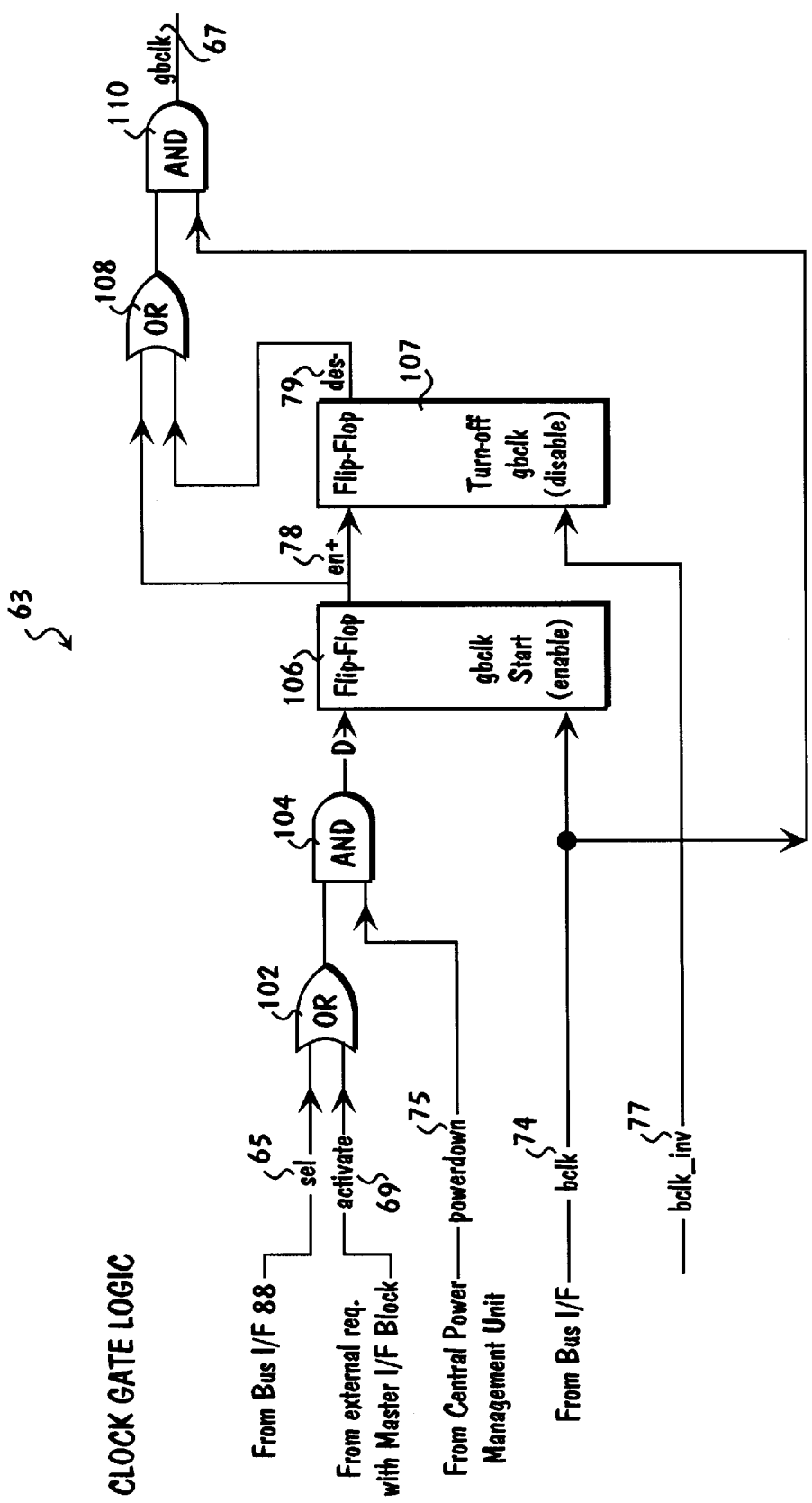
FIG. 7 is a diagrammatic illustration of an exemplary embodiment of clock gate control logic according to the present invention.

An embodiment of clock gate logic circuit 52n is now described with reference to FIG. 7. This description is by way of example only, as those workers having ordinary skill in the art in light of this disclosure will appreciate that there may be other ways to implement the clock gate logic circuitry of the present invention so as to selectively control transmission of the bus clock signal to the core logic.

Figure 8:
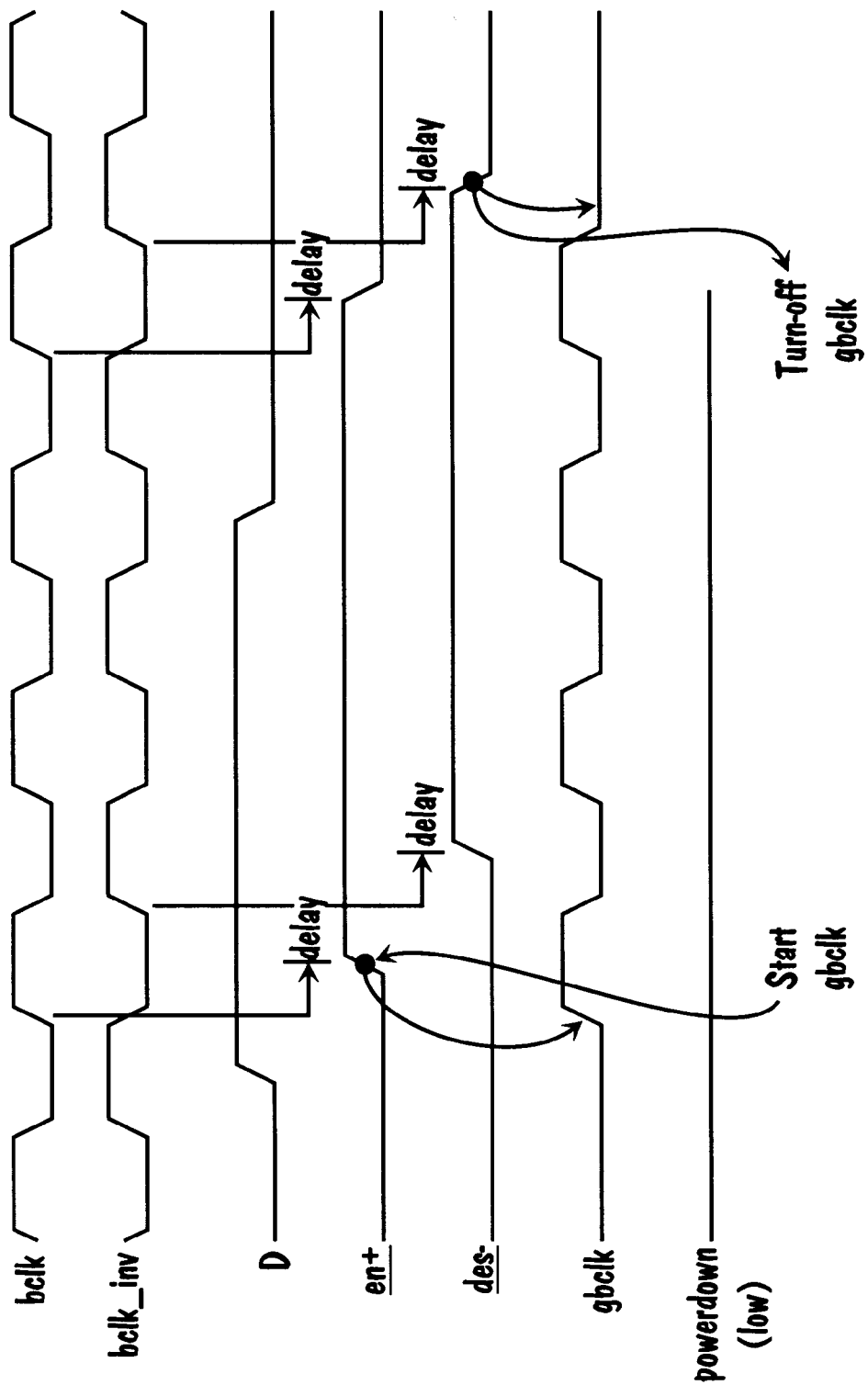
FIG. 8 is an exemplary timing diagram for the clock gate logic circuit.

The select signal (sel) 65 and activate signal 69 are received from a bus interface block 88 as earlier described, and input to OR circuit 102. Either of these signals may serve as an input to AND gate 104 to gate the bus clock. The output of OR 102 is communicated as a first input to AND gate 104 which also receives a power-down signal 75 (normally high or logical "1") so that the output of AND gate 104 (referred to as D in the figure), is high or logical "1", when it is desired to gate bus clock signal 74 to core logic 62. Flip-flop 106 receives the D output from AND gate 104 and bclk 74, so that when the D input is "1", en⁺ appears at the output of flip-flop 106, but when the output of AND 104 is "0", the output of bclk 74 is suppressed and does not reach core logic 62. In the event that power-down signal 75 goes low (logical 0), the output of AND gate 104 is also "0", thereby suppressing appearance of the gated bus clock 74 at the output of flip-flop 106. The output of flip flop 106 is referred to as the en⁺ (or enable signal) in the timing diagram of FIG. 8, since it is responsible for starting the gated clock.

A second flip-flop 107, OR gate 108, AND gate 110, and an inverted version of bus clock signal (bclk_inv) 77 is also provided for disabling or turning-off the gated clock. This disable signal is identified "des−" in the circuit of FIG. 7, and the timing diagram of FIG. 8. If the bus clock signal is used to disable the clock, a glitch in the gated clock will appear due to the delay of the gbclk with respect to the bclk. Therefore, an inverted version of the bus clock (bclk_inv) is used to turn off the gated clock as shown. The "en⁺" signal of flip flop 106 is provided to start the gated bus clock (gbclk), and is clocked of the rising edge of the bus clock signal (bclk). The "des⁻" signal from flip-flop 107 is provided to stop gbclk, and is clocked off the rising edge of the inverted bus clock signal (bclk_inv).

Figure 9:
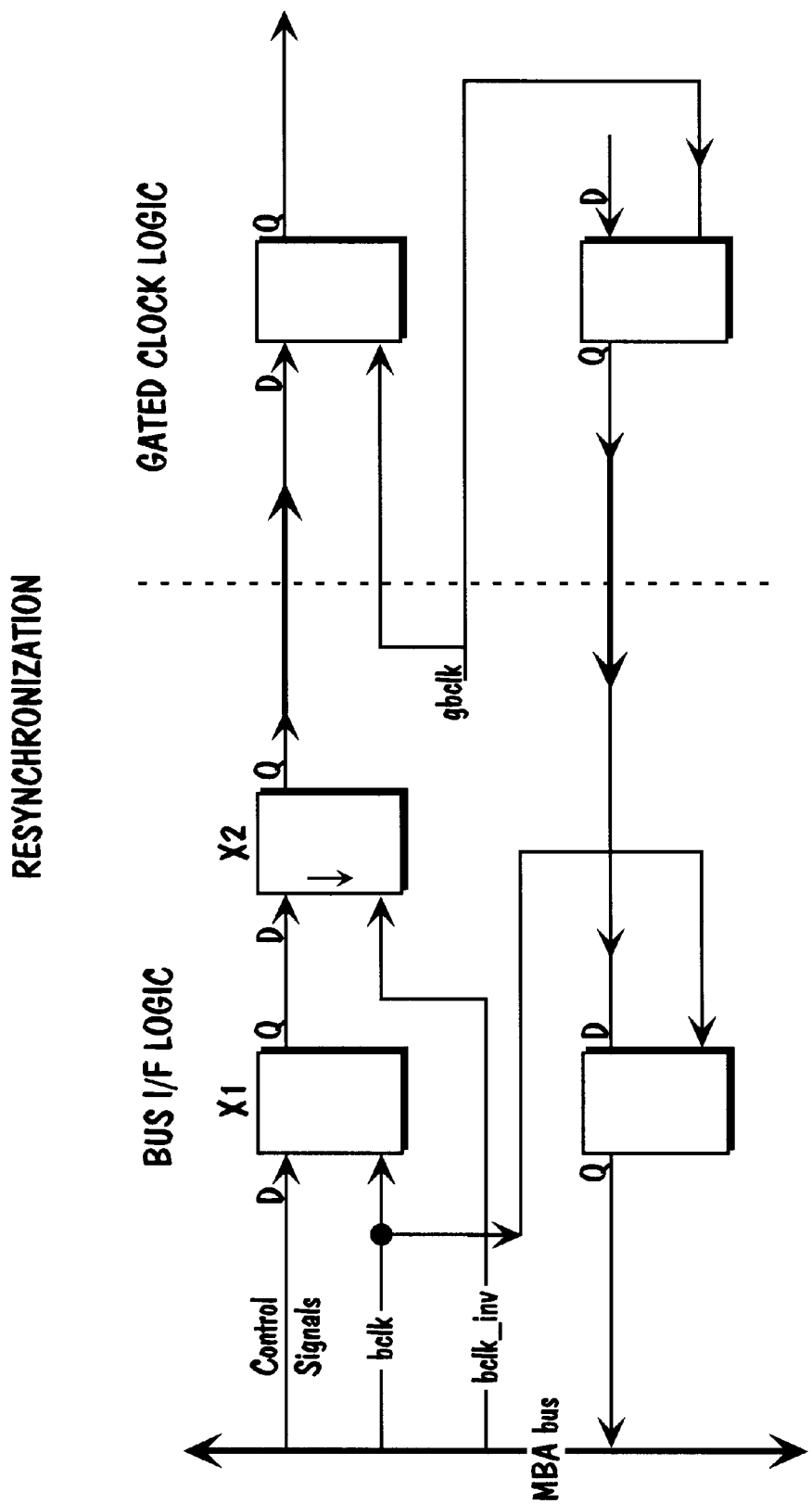
FIG. 9 is a diagrammatic illustration of exemplary resynchronization circuitry.
Figure 10:
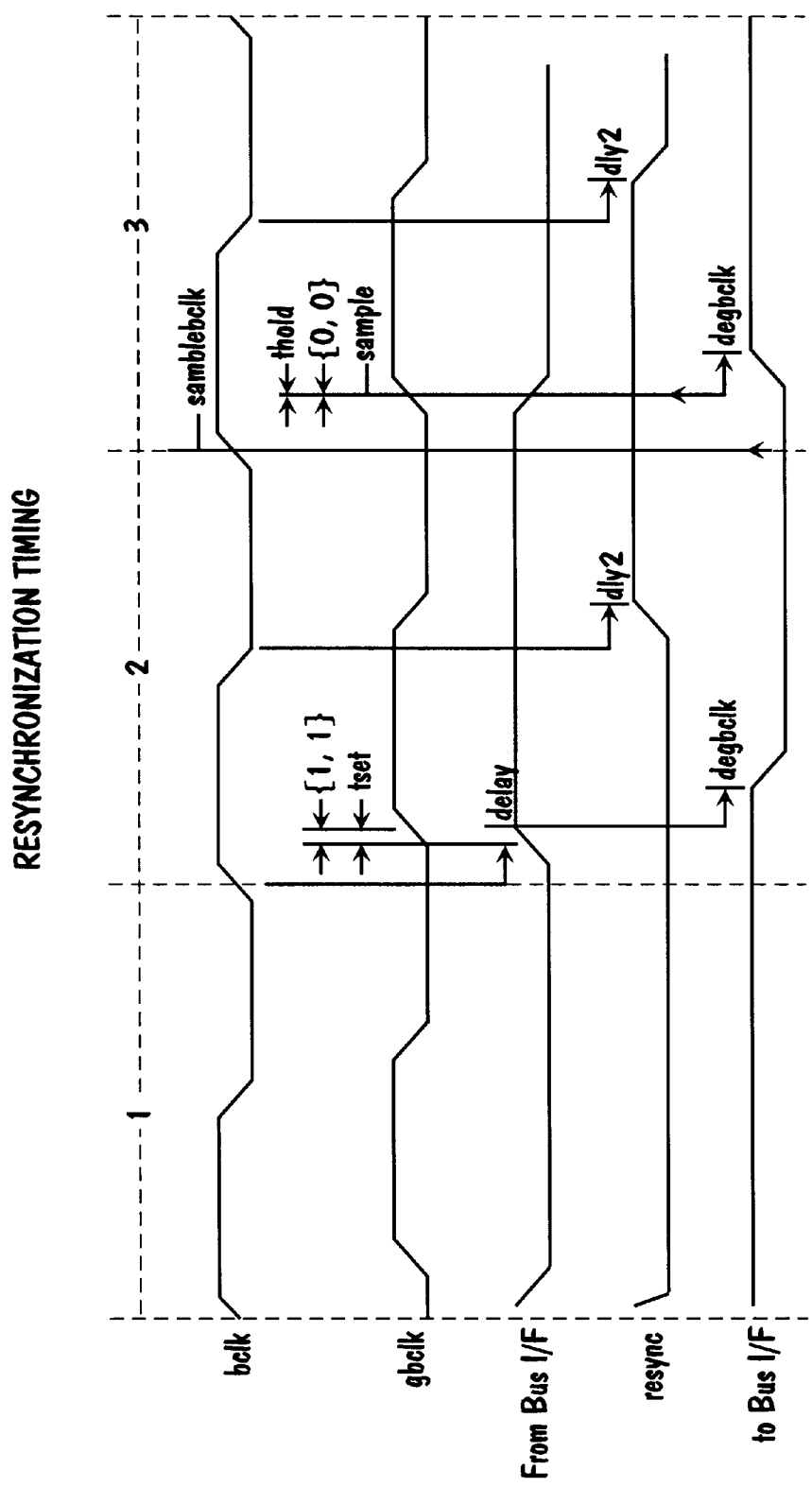
FIG. 10 is an exemplary timing diagram illustrating resynchronization timing.

Resynchronization of the control signals is now described relative to FIGS. 9 and 10. The signal from the bus interface clocked by bclk may produce tset-up and thold timing violations if sampled with the gated bus clock as illustrated in FIG. 9. To avoid this situation, the signal is resynchronized using the inverted bus clock (bclk_inv) in the circuit of FIG. 8 to resynchronize in the manner illustrated in FIG. 9. This resynchronization optimizes performance of the system in an environment where the select clock is routinely passed or stopped. Signals that flow from the core logic to the main bus interface do not generally require resynchronization.

The advantages of the system and method for distributed power management are clearly evident in the power management timing diagram of FIG. 13, which illustrates the minimum period of time during which the gated bus clock signals (gbclk1, gbclk2, . . . , gbclkn) are communicated to each of subsystem modules 1, 2, . . . , n. Four signals are illustrated for each of the modules. The first bus clock signal (bclk) is a periodic signal having logic high portions T1, T2, and Ta, in a repeating periodic pattern. The intervals T1 represent the address phase of a main bus cycle, the portions T2 represent the data phase of a main bus cycle, and the intervals Ta represent the main bus turn-around time during which ownership of the bus changes. The illustration is consistent with the equal opportunity (fairness) bus access rule described hereinafter which allows each bus master a revolving access to the bus.

A second signal "cycle_z_1," is in a particular embodiment of the present invention a three-state active low signal driven by the particular subsystem master module currently having access to the central bus 80. A "master" subsystem module (here module 1) can assert the cycle_z_1 signal after a bus access request has been made and granted by a central bus arbiter 130, which controls current access to the bus 80 by the various subsystem modules or CPU 41.

Figure 11:
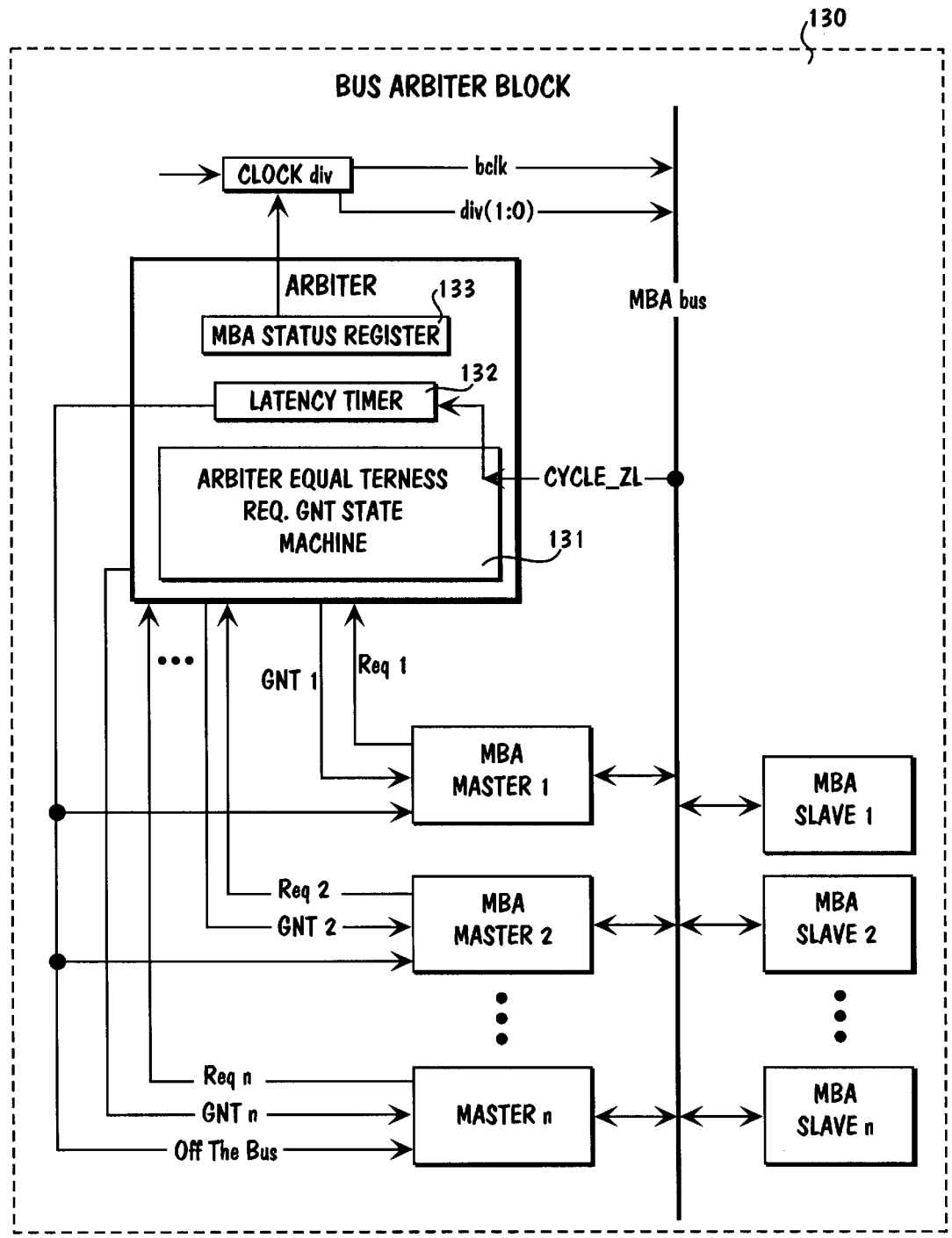
FIG. 11 is a diagram of an exemplary bus arbiter block diagram according to the invention.

Operation of the optional bus arbiter 130 is now described relative to an embodiment illustrated in FIG. 11. It should be noted that the bus arbiter is required for performance of certain main bus arbitration features and procedures that are advantageously incorporated into operational systems, however, the inventive distributed power management system and method do not require this particular or any other bus arbitration structure or operation.

With further reference to FIG. 11, arbiter block 130 desirably includes a request-grant state machine 131 block, a latency timer 132 block, and a main bus status register 133 block. Request-grant state machine 131 arbitrates from among one or more requests to access the main bus by the several master subsystem modules. Different priority schemes can be implemented according to various priority rule schemes. In one embodiment, the main bus implements an equal opportunity or fairness priority scheme, in which the master module that was last served will go to the bottom of the priority chain and all other modules will have a higher priority. This guarantees that each module will eventually be granted access before another module gets a second access. Other priority schemes may also be implemented.

Latency timer 132 monitors the maximum allocated time for a master to stay on the bus, and the number of bus clock cycles that cycle_z_1 stay asserted. In the event of a latency timer time-out situation, the latency timer will command the master to get off the bus with the OFFTHE-BUS signal. Main bus status register 133 maintains status and monitors main bus activity, the result of this monitoring activity being feed to the bus clock frequency control or divider 45, which can slow-down or speed-up the bus clock signal (bclk) accordingly, and output the proper divisor (div(1:0)) signals from clock notify block 44 to the bus.

Clock divisor circuit 45 receives the raw bus clock signal and divides that signal by div(1:0) and provides both the modified bus clock signal to the main bus and an indication of the frequency change in the form of the divisor so that any module maintaining a real time clock can maintain real-time clock integrity in spite of the clock frequency division.

Each master module (for example master1, master2, . . . , mastern is coupled to arbiter 130 so as to provide a bus access request signal (req_n) to the arbiter when access is desired, and coupled to receive a bus access grant signal (gnt_n) when access is granted to the particular module. As already described, latency timer 132 is coupled to receive a cycle_z_1 signal from the main bus and to generate and supply to any of the master modules the OFFTHEBUS signal when they have had ownership of the bus for more than a predetermined period of time. Slave modules are connected to the main bus but do not interact directly with the bus arbiter, they merely respond to requests communicated over the bus.

Figure 12:
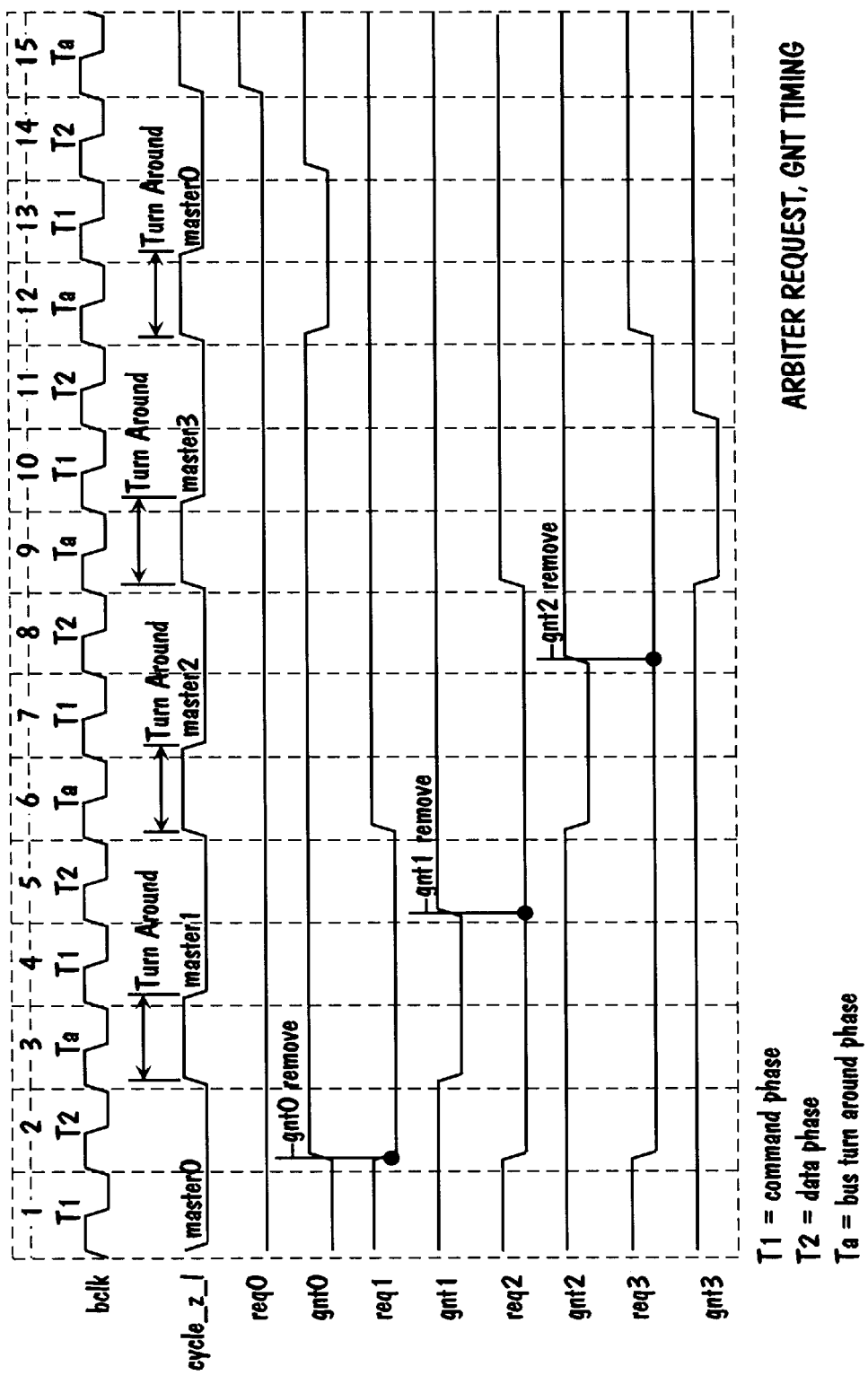
FIG. 12 is an illustration showing an exemplary arbiter block timing, including the timing relationships between the request and grant timings for several subsystems.

Arbiter bus access request and grant timing are now described relative to FIG. 12 which shows the functionality of the arbiter, in acknowledging the master subsystem request, and granting access to the bus according to the priority scheme described earlier. (Recall that Slave subsystem do not request bus access but merely respond to a request made by a master, or by the CPU.) In this example, master0 request the bus by asserting Req0 low "0". The first cycle is allocated to master0, and during that cycle, master1, master2, and master3 request access or ownership of the bus by asserting Req1, Req2, and Req3 low. At this point in time, the four masters are all requesting the bus. Because master0 was the last module served, according to the equal opportunity priority rule scheme, it will only be serviced next after masters 1, 2 and 3 have been serviced. The arbiter asserts the bus grant (GNT) signal one at the time, and then de-asserts the grant signal line after the master has started its allocated cycle. In FIG. 12, deassertion of the GNT line is indicated during the data phase at time T2 of successive bus cycles (e.g. cycles 2, 5 and 8), and assertion of the GNT line at is indicated by Ta representing the bus turn-around time (e.g. at cycles 3, 6 and 9).

The cycle_z_1 signal is valid for the complete bus cycle. The logical "1" to logical "0" transition of the cycle_z_1 signal 152 flags or indicates the start of the bus cycle, and the logical "0" to logical "1" transition flags or signals the end of the cycle. Slave subsystem modules (as compared to master subsystem modules) only monitor this cycle_z_1 signal in order to enable a valid address decode at the start of each cycle T1. Recall that the address decode unit 91 is provided as a component of the bus interface 54 which initiates the process by which the bus clock signal may be gated to the core logic component of that subsystem to permit the desired access. The central arbiter 130 will also monitor the cycle_z_1 signal to determine when to assert or remove the master subsystem bus grant signal.

In addition, the arbiter can control latency timer(s) 46 and provide information to the power management logic through the bus status register 133 regarding central bus 80 traffic. The subsystem select (sel_1, sel_2, . . . , sel_n) signal generated by the subsystem bus interfaces 54*n*, have already been described relative to the bus interface and clock control gate logic as have the gated bus clock signals (gbclk1, gbclk2, gbclkn).

The manner in which power consumption is reduced by gating or withholding the clock from core logic is now described relative to modules 1, 2, and n, and timing diagrams of FIG. 13*a*, 13*b*, and 13*c*. With respect to FIG. 13*a*, during a first time interval, subsystem module 1 responds to the cycle_z_1 signal cycle targeted to module1, by a master module upon a rising edge of bus clock signal (indicated by T1), and the sel_1 signal goes low as a result of the target module1 decoding a valid address, and indicating the master that can execute the cycle so that the gbclk1 is communicated to the core logic of subsystem module 1 during the period of time in which sel 1 signal is asserted and until the end of the next bus clock cycle after which sel 1 signal is deasserted. This interval is designated "active 1". Note that only subsystem module 1 is consuming power as a result of having the bus clock gated to its core logic circuits during portions of elapsed bus clock cycles 2–3, and that subsystem modules not selected during that particular interval of bus clock signals are in the power saving mode. By comparison, conventional systems implementing only a central power management system and/or method will not provide separate gated bus clock signals to individual subsystem components, but rather provide a continuously running clock to each subsystem circuit.

FIG. 13*b* illustrates analogous operation of module 2 to that already disable relative to FIG. 13*a* for module 1 but at a later time. However, in FIG. 13*b*, module 2 asserts a cycle_z_1 signal during interval 2 (approximately corresponding to elapsed bus clock cycles 4–5) and sel 2 signal during that same interval, to thereby enable gbclk2 for the duration in which sel 2 signal is asserted, and until the end of the following full clock cycle, here designated "active 2". Power is consumed by core logic 2 within subsystem 2 only during the period of time designated as "active 2", and power is saved during periods of time identified by "power saving 2". This process is repeated for any other number of subsystem modules that may be configured within the computer system 10, such as for subsystem module n shown in FIG. 13*c*.

The power saving interval are clearly evident from an inspection of FIGS. 13*a*, 13*b*, and 13*c*. For example, in FIG. 13*a*, power is consumed as a result of gating the bus clock to core logic 1 only during the period indicated by "active 1". During intervals identified by "power saving 1" the bus clock is gated to the core logic 1, "0" state and no power is consumed as a result of the dynamic switching within the core logic 1 elements, power only being consumed in core logic 1 circuits by virtue of the static power needed to maintain states within that particular core logical block and, of course, the small amount of power consumed by the interface logic and clock control circuits. Power (P) consumed by a circuit is $P=\frac{1}{2}V^2Cf$, where V is the voltage, C is the capacitance, and f is the switching frequency of the device (gate) so that when f=0, no or de minis power is consumed by the circuit.

Figure 14:
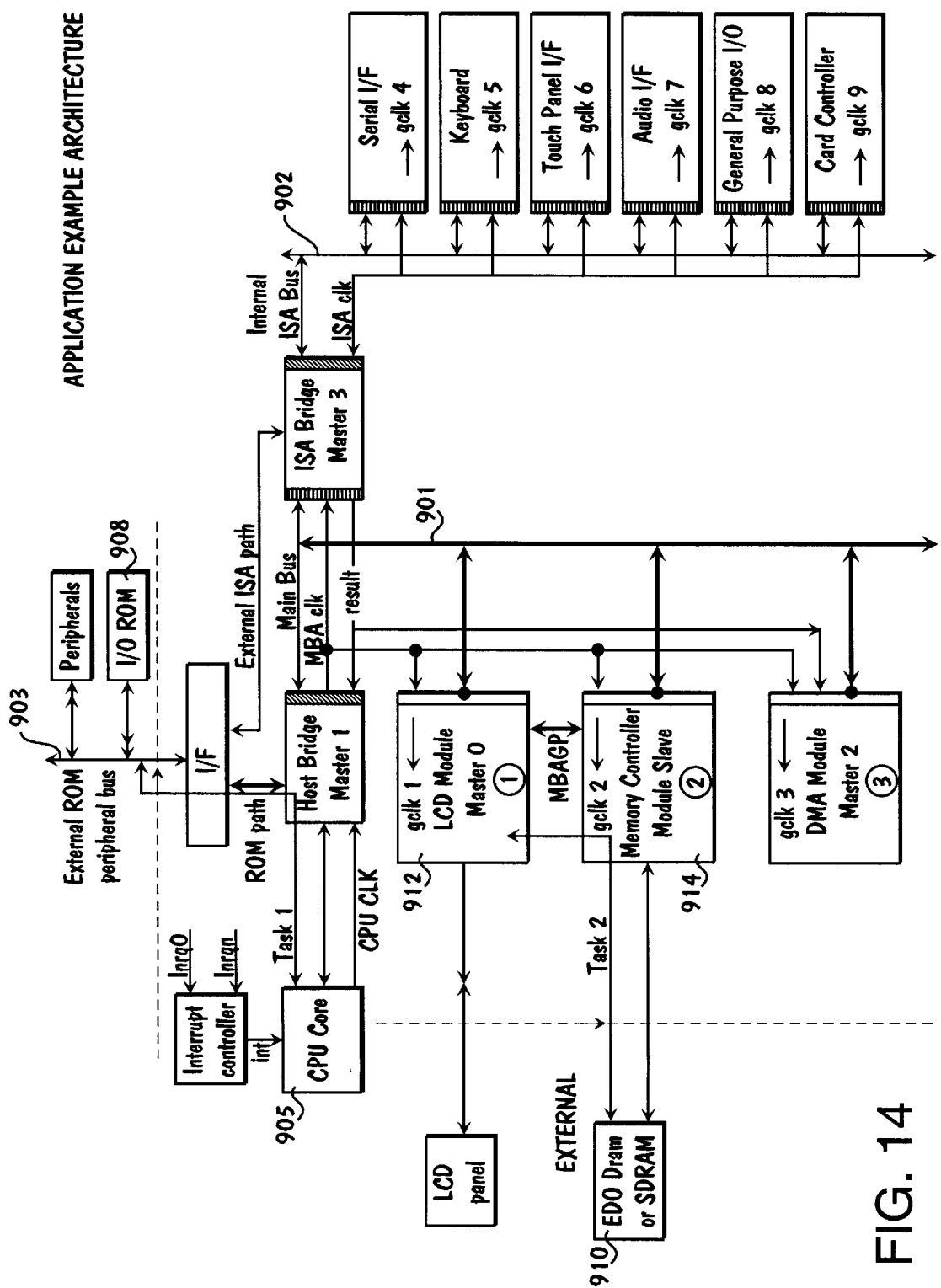
FIG. 14 is diagrammatic illustration showing an exemplary system configuration including resources coupled to the system by an ISA bus and other resources coupled to the system by the main bus.
Figure 15A:
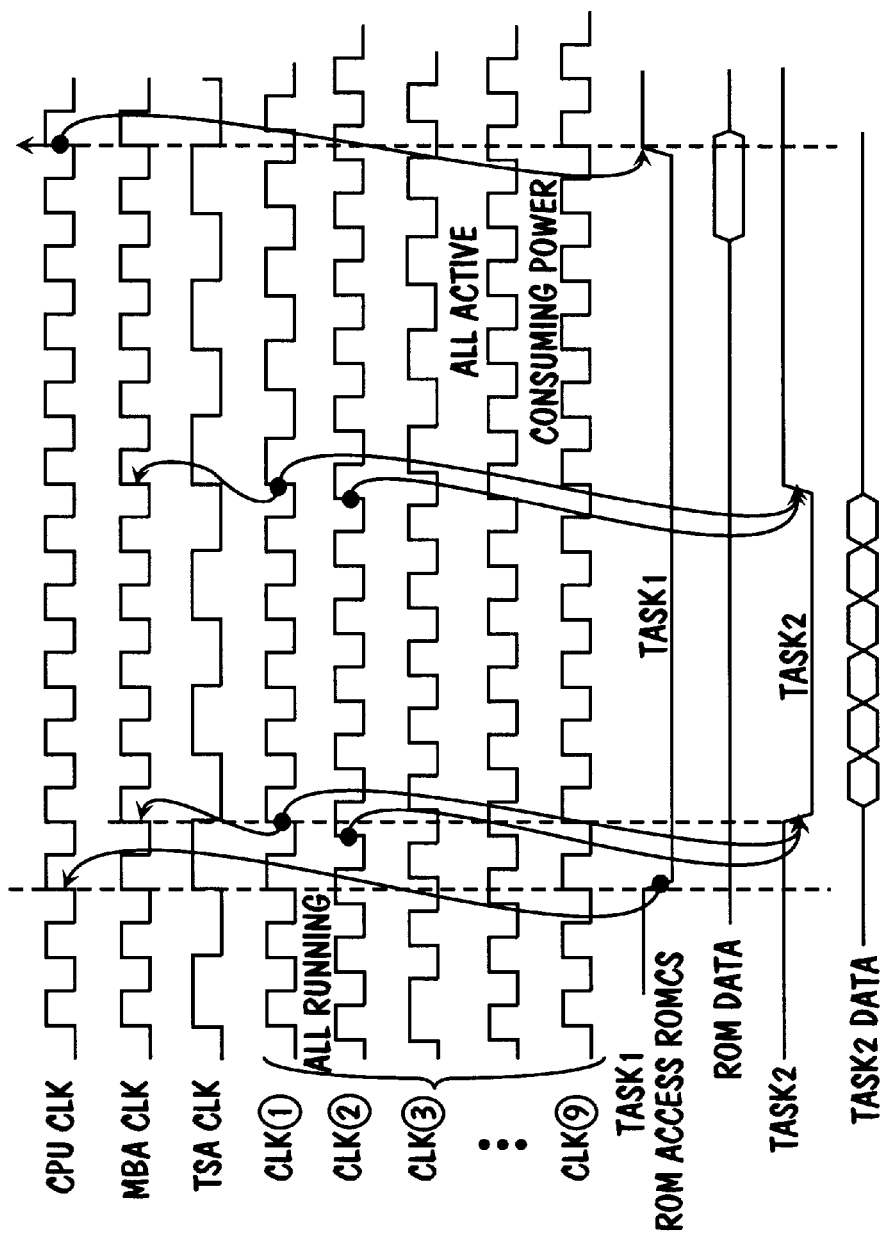
FIG. 15a is an exemplary timing diagram showing performance of a conventional non-distributed power management system during a multitasking processing session.
Figure 15B:
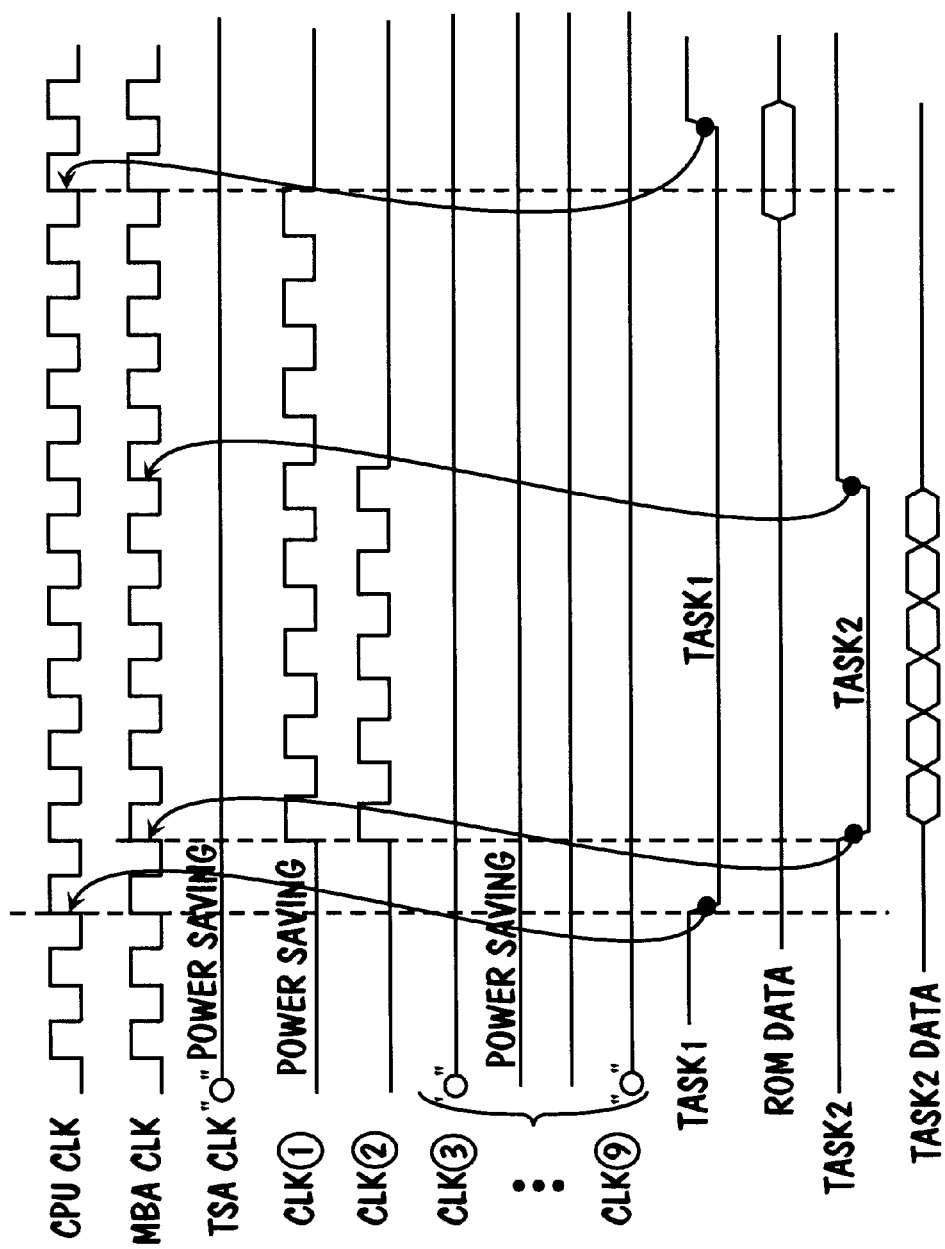

A further discussion of the power saving advantages of this inventive structure and method are provided with respect to FIGS. 14 and 15 which respectively illustrate an exemplary system architecture, and exemplary timing diagrams for conventional multi-tasking clock control (or lack thereof) and the inventive clock control to achieve power consumption savings, where each subsystem is operating in a multi-tasking or concurrent processing mode.

In this example, internal ISA bus 902 is a secondary bus relative to the main bus 901. The external peripheral bus 903 is also a secondary bus. If the CPU core 905 requests data from the ROM 908 (referred to as TASK 1), this data request does not require access to the main bus 901 or the secondary ISA bus 902. Here, the clock that interfaces to the ROM 908 is activated at the same time TASK 1 is initiated. Also, assume that the Liquid Crystal Display (LCD) module 912 requests data from memory 910 (referred to as TASK 2). TASK 2 requires that the gated bus clock (gbclk) of LCD Module 912 and Memory Control Module 914 be activated because each of these modules is required to satisfy LCD 903's request for data. Even though performance of two tasks are performed concurrently, the gated clock signals (gblck_4, . . . , gbclk_9) for the other ISA bus 902 connected modules (Serial I/F 921, Keyboard 922, Touch Panel I/F 923, Audio I/F 924, General Purpose I/O 925, and Card Controller 926), and the gated clock signal gbclk_3 for the DMA Module 930 on the main bus 901 remain inactive and their associated modules remain in their power saving mode. If TASK 2 finishes before TASK 1 finishes, then the gated clock signal of the LCD Module 912 and Memory Controller 914 will transition from the active mode to the power saving mode independently of any CPU interaction or control. The CPU 905 is still busy performing TASK 1. In the conventional system, all the clocks run continuously and their circuits consume power as shown in FIG. 15a. By comparison, the inventive distributed power management system allows each module to self control activation of core logic circuits so that only those core logic elements needed during particular bus cycles are provided clock signals.

For a representative subsystem having 4,000 gates in that subsystem, the following comparisons can be made. Assuming that the conventional system providing the same final result communicates the clocking signal to each and every one of the gates within that subsystem, that is approximately 4,000 gates. And, further assuming that power is consumed by about one-third of the number of gates which receive switching clock (K=⅓), and that power consumed per gate equals (using the Nippon Electric Corporation (NEC) formula for 0.5 $\mu$ semiconductor technology):

2.08×f×(number of gates×K)=power consumed (mW)

2.08×100 MHz×(4000 gates×⅓)=277 milliwatts of power will be consumed by the conventional circuit.

However, for the inventive exemplary circuit in which only 270 gates of the total 4270 gates are provided within the subsystem bus interface and the remaining 4000 are provided in the core logic which is not clocked the power consumption will be:

2.08×100 MHz×(270 gates×⅓)=19 milliwatts of power

This represents a power consumption to about seven percent (7%) of the power consumed in the conventional implementation, a reduction of approximately 93%. This comparison is exemplary and an approximation to those results that will be achieved in practice. Those workers having ordinary skill in the art in light of this description will realize that the actual power consumed by a monolithic circuit will generally depend on the particular circuit design, including on the size and length of the traces, and on individual device characteristics.

Figure 16:
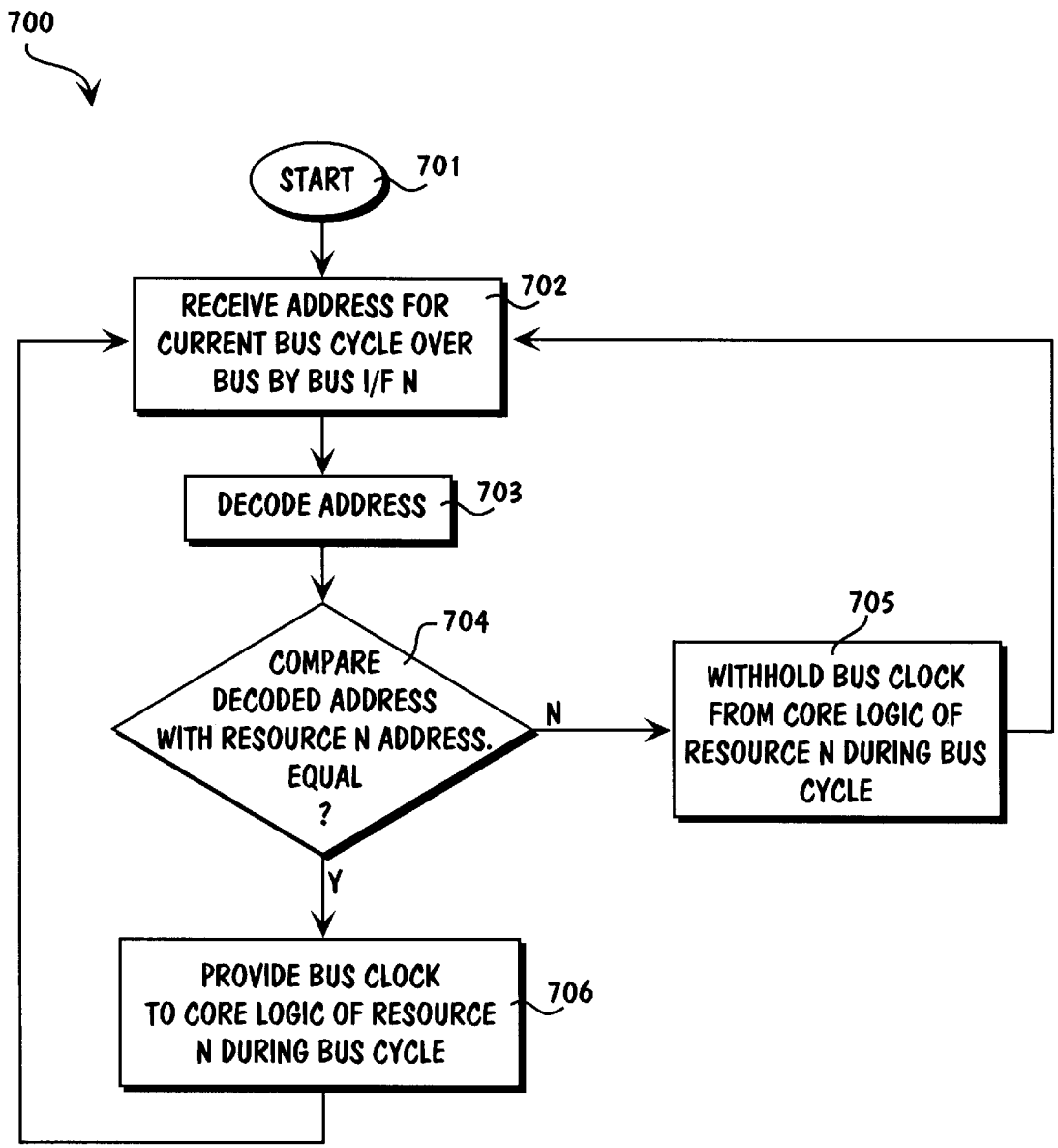
FIG. 16 is a diagrammatic flow-chart illustrating one embodiment of the inventive distributed power management method.

Apparatus and system suitable for performing the inventive method have been described in considerable detail. FIG. 16 is a flow chart diagram which shows top-level operation of an embodiment of the inventive distributed power management method 700. The bus interface logic of each subsystem module or system resource implementing distributed power management monitors the main bus for addresses (or other indicators) communicated over the bus (Step 702). Where address information is used, the address is decoded (Step 703), and then a comparison is performed in each subsystem between the address associated with that subsystem and the decoded address (Step 704). If the address appearing on the system bus matches (equals) the address associated with the particular subsystem, indicating that operation of that subsystem is needed, then the bus clock is provided to the core logic of that subsystem so that the core logic can perform the required operation (Step 706). If the address appearing on the system bus does not match (not equal) the address associated with the particular subsystem, indicating that operation of that subsystem is not needed during that bus cycle, then the bus clock is withheld from the core logic of that subsystem and power consumption that would otherwise be consumed by that core logic is reduced (Step 706).

The structure and method already described has emphasized a parallel bus configuration, but the inventive distributed power management system and method are not limited to such parallel bus configurations or processes. Other structures and methods for signaling the subsystems or modules are applicable for the DPMS and DPMM besides those that use Address bus decoding. Three alternate approaches are now described, including a structure and method that provide some CPU interface logic to generate module select signals, a structure and method that communicate selection data over a serial bus or wire loop, and a wireless structure and method wherein communication between the CPU and the subsystems is achieved using wireless links, such as Radio Frequency (RF) or optical links including Infrared.

Figure 17:
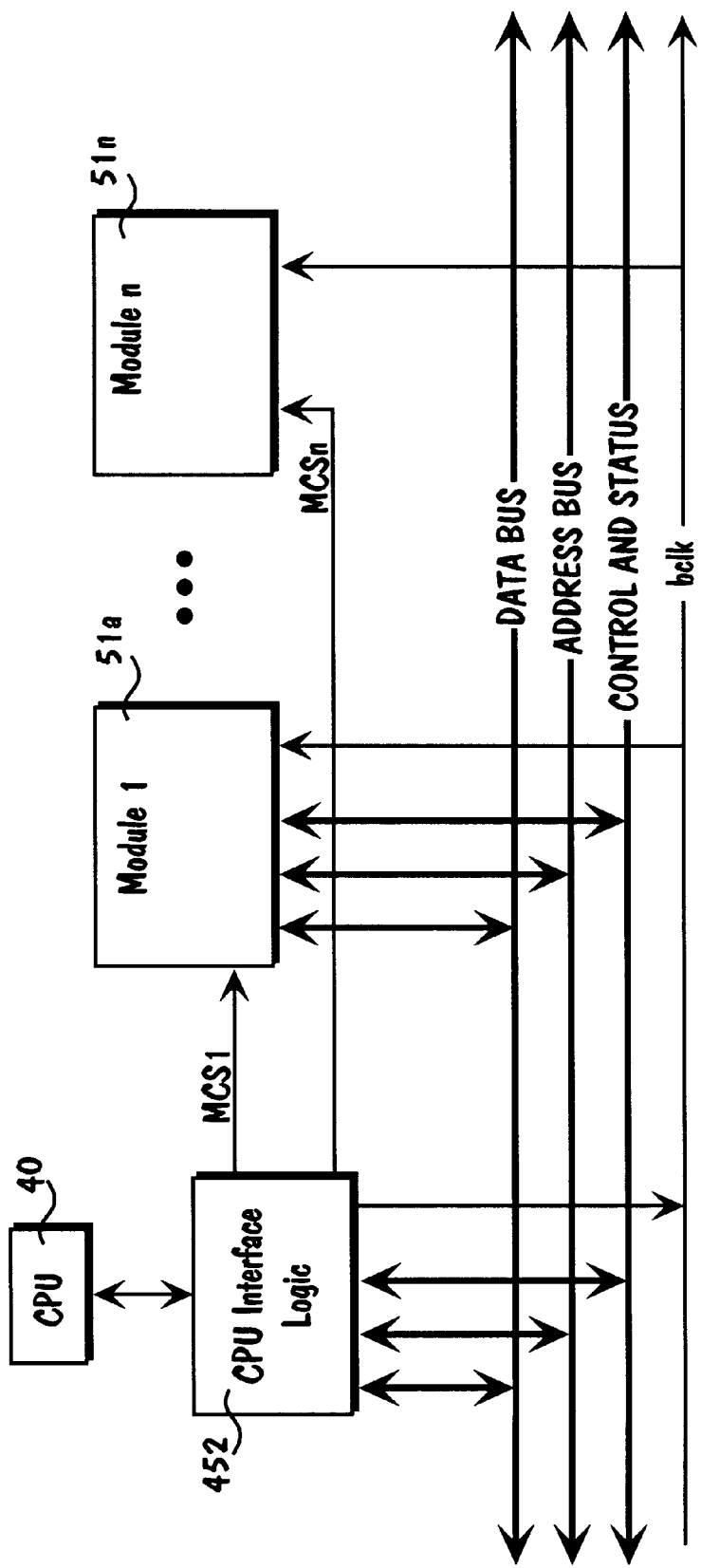
FIG. 17 is a diagrammatic representation of another embodiment of a computer system implementing a distributed power management system using a CPU Interface logic block to supply module select signals.

With reference to FIG. 17, CPU 40 is connected to a CPU Interface Logic Unit 452 which receives communications from CPU 40 and identifies the need to activate one or more subsystems 51n. In this embodiment, the Interface Logic Unit 452 implements the functionality of the Address Decode logic block 91 previously described, such that the Interface Logic Unit 452 is coupled to receive address information from the CPU 40 and to decode that address information in a conventional manner. Once the address of a subsystem or module is identified, the Interface Logic Unit 452 generates a module select signal (MCSn) and communicates that select signal over a suitable link, such as a bus or wire, for example. The logic within module 451n is the same as that earlier shown and described relative to module 451n except that module 451n need not include address decode logic in the slave bus interface.

If module1 451a is identified, then a module1 select signal (MSC1) is asserted and communicated to the logic within module 1, which upon receipt will gate the bus clock (bclk) signal to the core logic as before, and when deasserted with block communication of the bus clock to the core logic. In some embodiments, the module select signal may be a "chip select" signal. Thus power conservation is achieved as before by minimizing the number of circuits or gates which are dynamically switched. This implementation also provides the operation benefits during multi-taking operation as already described relative the other parallel bus based implementation.

The CPU Interface logic 452 passes other data, address, control and status information to conventional busses. The data bus, Address bus, and control and status bus components may still be provided on one or more conventional busses.

Figure 18:
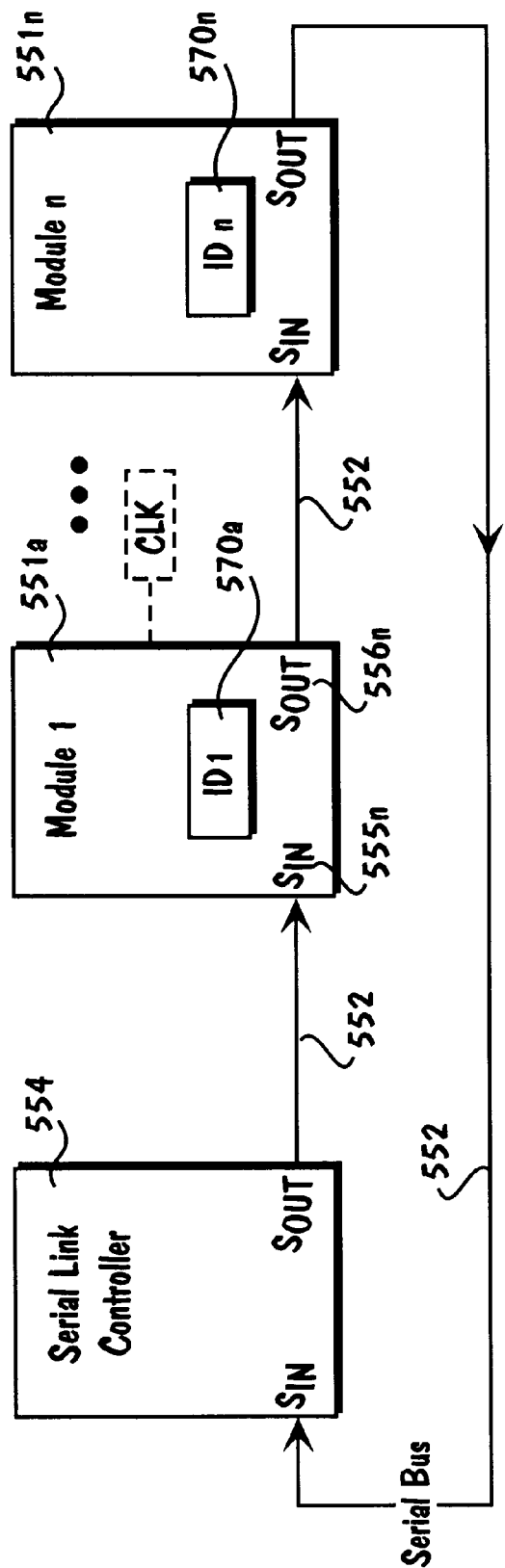
FIG. 18 is a diagrammatic representation of yet another embodiment of a computer system implementing a distributed power management system implementing a serial bus or interface to interconnect modules and communicate module select signals.

A serial link implementation is now described with reference to the embodiment in FIG. 18, which provides a plurality of subsystem modules 551a, ..., 551n connected by a serial bus 552 to form a closed signaling loop. The loop may also include a Serial Link Controller 554. The protocol for a serial linked system is based on a module address or module Identifier (ID) byte 570n which in the exemplary embodiment is provided as part of a command header of the serial protocol data stream. The data stream is communicated over the serial link 552 and sequentially passed between the Serial link controller and the subsystem modules. When a module 551n receives the command header at a serial input port $S_{in}$ 555n, it processes the data or information contained in the header to determine the intended target subsystem, and upon recognizing that the particular module is the intended target, generates select or activation signal to supply or gate a clock signal to the core logic within the particular module.

In these serial link embodiments, the clock signal may either be supplied with the data along the serial link, or optionally provided separately by each module 551n or alternatively by a separate clock generator circuit 560n associated with each subsystem module 551n. When provided separately, the clocks for the different subsystems would generally operate asynchronously unless synchronization means were provided. Such external clock circuits could also optionally operate a different clock rates to match the performance requirements of the particular subsystem with which the clock is associated.

If the subsystem module does not match the transmitted ID, the module will route the received serial stream to its serial output port $S_{out}$ that connects to the following subsystem modules connected to the serial link. Each serial module receiving the serial stream compares its unique ID with the ID appearing in the serial stream. Where it is desired or necessary for more than one subsystem module to be active, multiple ID's can be communicated either in the same serial data stream header or in different headers.

An exemplary serial bus protocol includes a Command Header comprising an opening flag, a subsystem ID, and a command, and a Data Field comprising data and a closing flag. The serial link may be a Universal Serial Bus (USB) or any other transport of commands and data where the serial bus connects multiple subsystems, devices, or peripherals. In some instances it is anticipated that only some of the subsystems, devices, or peripherals coupled by the serial bus or link may be able to implement distributed power management. The serial link may for example, implement a local area network (LAN), a token ring, or any other conventional network; or it may merely connect one or more peripheral devices to the CPU.

Figure 19:
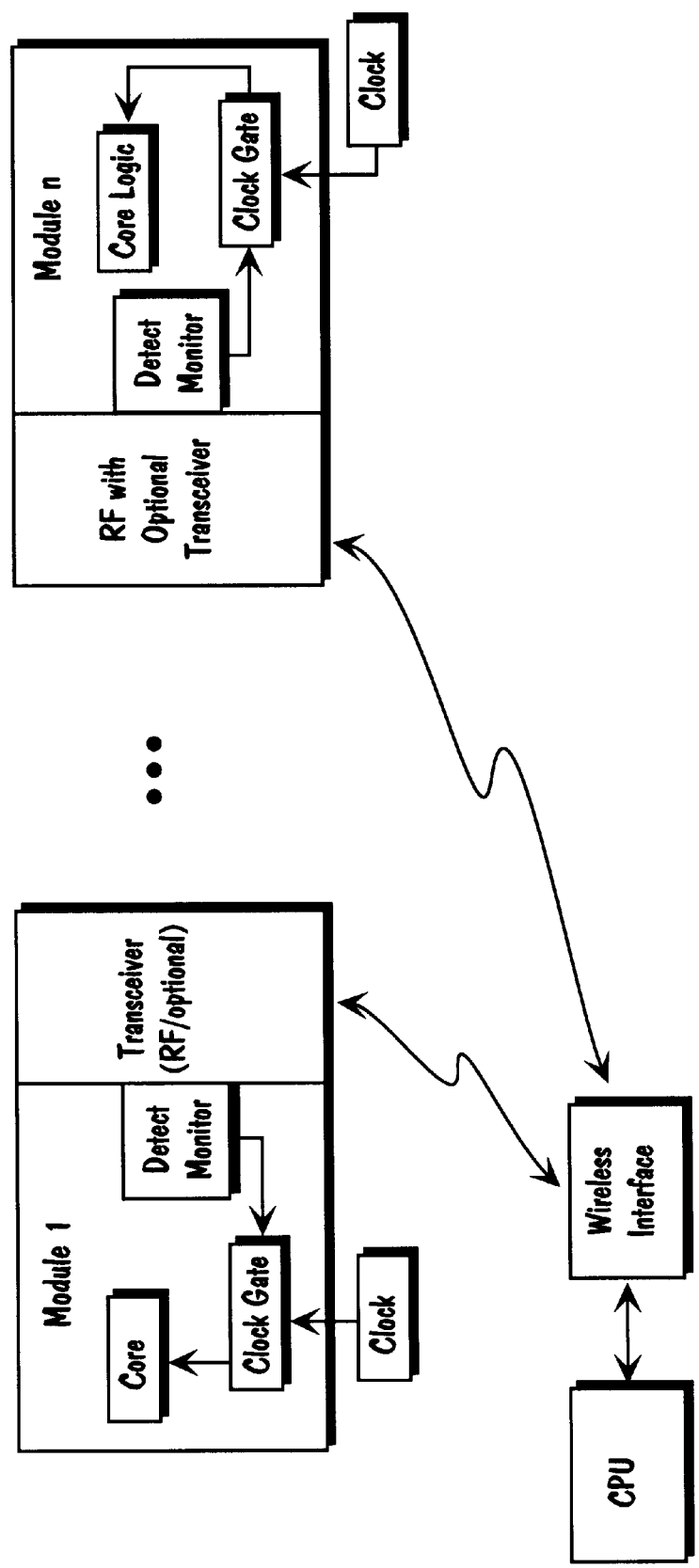
FIG. 19 is a diagrammatic representation of even another embodiment of a computer system implementing a distributed power management system implementing wireless transmission of module ID or module select signals.

The inventive structure and method may also be embodied in a wireless system by signaling a subsystem module using a transmitted ID that is similar to the serial protocol described previously in this specification. However, in the wireless implementation, the ID is transmitted by an optical, radio frequency, or other electromagnetic wave not requiring a physical connection. A simplified block diagram of a wireless embodiment is illustrated in FIG. 19. Wireless embodiments will typically provide separate clocks associated with each module (either internal or external), although clock signal could be provided to each module in the same wireless transmission or via a separate wireless link. Of course even among the embodiments that implement a physical connection between components, the physical connection may be by wire, optical fiber, transmission line, or any other medium capable of supporting the required communication.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

All publications and patent applications cited in this specification are herein incorporated by reference as if each individual publication or patent application were specifically and individually indicated to be incorporated by reference.

We claim:

1. In a computer system having a device and a communications link for communicating with said device, a method for managing power consumption by said comnputer system comprising:

associating a particular device identifier with said device;

monitoring communications over said communications link to determine whether said communications include said particular device identifier;

withholding a device operating input from said device when said communications do not include said particular device identifier; and providing said device operating input to said device only when said communications include said particular device identifier;

said providing of said device operating input causing said device to transition from a non-operational power conservative state to an operational state wherein said device consumes more power than in said non-operational state.

2. The method in claim 1, wherein said communications link is selected from the group consisting of a system bus, a peripheral interconnect bus, a parallel bus, a serial bus, a hard-wired signal line, a plurality of signal lines, a wireless communications channel, and combinations thereof.

3. The method in claim 1, wherein said particular device identifier comprises a device address, said communications link comprises a bus, and said device address is communicated over said bus.

4. The method in claim 1, wherein said particular device identifier comprises a chip select signal.

5. The method in claim 1, wherein said particular device identifier is communicated over a serial bus.

6. The method in claim 1, wherein said particular device identifier is communicated by broadcasting said particular device identifier over a wireless communications link.

7. The method in claim 1, wherein said device operating input is a clock signal.

8. The method in claim 7, wherein said clock signal is a clock signal operating at the bus clock frequency.

9. The method in claim 8, wherein said predetermined time period comprises a single bus cycle, and said bus operates at a clock frequency of between 10 MHz and 10 Ghz.

10. The method in claim 8, wherein said predetermined time period comprises a single bus cycle, and said bus operates at a clock frequency of between 1 Hz and 10 MHz.

11. The method in claim 1, wherein said particular device identifier comprises device addresses, and wherein said particular device identifier comprises a particular address for said device.

12. The method in claim 1, wherein said device comprises a multiplicity of logic gates and said device operating signal comprises a clock signal operative to trigger transitions of said logic gates; said communications link comprises a bus, and said monitoring communications over said communications link comprises monitoring communications over said bus during each bus cycle and said providing and withholding of said clock signal to said device occurring substantially at each bus cycle.

13. The method in claim 1, wherein said communications link comprises a bus, said monitoring communications over said bus to determine whether said communications include said particular device identifier occurs for each single bus clock cycle, and said bus operates at a clock frequency of between 10 MHz and 10 GHz.

14. The method in claim 1, wherein said computer system operates to perform a plurality of substantially simultaneous operations in a multi-tasking environment, and wherein said method further comprises:

communicating said command containing said particular device identifier only during a time period in which said device is actually being accessed by said computer system, independent of whether a particular processing task associated with said device during said time period has been completed; and providing said device operating input only to said device when said device is actually being accessed by said computer system.

15. The method in claim 14, wherein said time period is a single bus cycle.

16. A distributed power management apparatus for a computer system having a processor and at least one bus coupled for communication with said processor, said apparatus comprising:

a plurality of devices each having a particular unique device identifier and coupled for communication with said bus;

a plurality of monitoring circuits monitoring communications over said bus during each predetermined time period to determine any device identifiers broadcast over said bus during said predetermined time period and comparing said broadcast device identifiers to said particular unique device identifiers, each of said monitoring circuits being associated with only one of said devices and only one of said particular unique device identifiers;

a plurality of control circuits, each said control circuit associated with only one of said devices, each for selectively withholding a device operating input from its associated device when none of said broadcast device identifiers match said unique particular device identifier for its associated device, and for providing said device operating input to its associated device when one of said broadcast device identifiers match said unique particular device identifier for its associated device.

17. The distributed power management apparatus in claim 16, wherein each said monitoring circuit is continually active to monitor and compare said bus communications, and said device becomes active only after receiving said device operating input.

18. The distributed power management apparatus in claim 16, wherein said device operating input comprises a clock signal operating at the bus clock frequency.

19. The distributed power management apparatus in claim 16, wherein each said control circuit is operable to withhold or provide said device operating input on a bus cycle by bus cycle basis.

20. The distributed power management apparatus in claim 16, wherein said device identifiers comprise device addresses, and wherein said particular unique device identifier comprises a particular address for each device of said plurality of devices.

21. The distributed power management apparatus in claim 16, wherein said predetermined time period comprises a single bus cycle, and said bus cycle operates at a clock frequency of between 1 kHz and 10 GHz.

22. A power consumption management apparatus for use with an electronic system having a processor and a device coupled to said processor, said apparatus comprising:

at least one circuit driven by a clock signal having a clock signal period within said device;

a detector circuit for detecting an access request to said device;

a clock control circuit for selectively providing a clock signal to said at least one clock driven circuit in response to detection of said access request and for withholding said clock signal in the absence of said detection;

said clock control circuit configured to selectively provide and withhold said clock signal to said at least one clock driven circuit of said device within a predetermined number of clock periods;

said clock driven circuit consuming substantially no power when said clock signal is withheld so that power consumption by said clock driven circuit and by said electronic system is reduced during periods of time during which no access request for said device have occurred.

23. The apparatus in claim 22, wherein said predetermined number of clock periods is a single clock period, and power consumption by said clock driven circuit and by said electronic system is reduced during each clock period for which no access request for said device has occurred.

24. The apparatus in claim 22, wherein said predetermined number of clock periods is between 1 and 10 clock periods.

25. The apparatus in claim 22, wherein said at least one clock driven circuit comprises substantially all logic circuits which perform the core device functionality in said electronic system.

26. The apparatus in claim 22, wherein said device includes a first component which operates continuously so as to provide the detecting functionality and a second component that operates in a low power consumption mode unless the first component signals the second component that its operation is needed during that time period; said first component withholding a device operating input from the second component when no access requests are detected by said detector circuit for said device; and provide the device operating input to the second component when an access request is detected by said detector circuit for said device; the number of circuit components is reduced to a minimum in the first component so that the number of circuit elements which are continuously active are reduced; whereby power consumption by said electronic system is reduced.

27. In a computer system operating in a multi-tasking computing environment supporting time-multiplexed task execution and having a plurality of devices, and a communications link for broadcasting a device identifier to said plurality of devices, a system for managing power consumption by said devices comprising:

a unique device identifier associated with each said device;

a comparator for comparing said broadcast device identifier with each said unique device identifier to determine whether said broadcast device identifier matches any of said unique device identifiers;

a control circuit for withholding a device operating input to any of said plurality of devices when said broadcast device identifier does not match said unique device identifier associated with said device and for providing said device operating input only to said devices only when said broadcast device identifier matches said unique device identifier associated with said device;

said broadcast device identifier matching said unique device identifier only during a period of time during which said device associated with said unique device identifier is being accessed to execute one of said time-multiplexed tasks.

28. The system in claim 27, wherein said communications link is selected from the group consisting of a system bus, a peripheral interconnect bus, a parallel bus, a serial bus, a hard-wired signal line, a plurality of signal lines, a wireless communications channel, and combinations thereof.

29. The system in claim 27, wherein said unique device identifier comprises a unique device address, said broadcast device identifier comprises a unique device address belonging to one of said devices broadcast over a bus.

30. The system in claim 27, wherein said broadcast device identifier comprises a chip select signal, and said unique device identifier comprises a unique identifier associated with a particular chip.

31. The system in claim 27, wherein said broadcast device identifier comprises a device identifier communicated over a serial bus.

32. The system in claim 27, wherein said broadcast device identifier comprises a device identifier communicated by broadcasting said identifier over a wireless communications link.

33. The system in claim 27, wherein said device operating input is a clock signal.

34. The system in claim 27, wherein said clock signal is a clock signal operating at the bus clock frequency.

35. The system in claim 34, wherein said comparator compares said broadcast device identifier with each said unique device identifier during a predetermined period of time and said predetermined time period comprises a single bus cycle, and said bus operates at a clock frequency of between 10 MHz and 10 Ghz.

36. The system in claim 34, wherein said comparator compares said broadcast device identifier with each said unique device identifier during a predetermined period of time and said predetermined time period comprises a single bus cycle, and said bus operates at a clock frequency of between 1 Hz and 10 MHz.

37. The system in claim 27, wherein said unique device identifiers comprise unique device addresses, and said broadcast device identifier comprises a unique device address belonging to one of said devices.

38. The system in claim 27, wherein said communications link comprises a bus, said comparator compares said broadcast device identifier with each said unique device identifier during a predetermined period of time, and said predetermined time period comprises a single bus cycle.

39. The system in claim 38, wherein said predetermined time period comprises a single bus cycle, and said bus operates at a clock frequency of between 10 MHz and 10 GHz.

40. The system in claim 27, wherein said computer system operates to perform a plurality of substantially simultaneous processing operations in a multi-tasking mode, and wherein said comparator only determines those devices being accessed during a predetermined time period, independent of whether the processing operation associated with each of said devices has been completed, and providing said device operating input only to those devices actually being accessed during said predetermined period of time.

41. The method in claim 40, wherein said predetermined time period is a single bus cycle.

42. The apparatus in claim 27, wherein said comparator and said control circuit operate continuously and each of said plurality of devices includes a core circuit component that is placed in a low power consumption mode unless said control circuit signals said core circuit that its operation is needed during that time period; said control circuit withholding a device operating input from said core circuit when none of the broadcast device identifiers match the identifier for the particular device; and provide the device operating input to said core circuit when one of said broadcast device identifiers match that particular device; the number of circuit elements is reduced to a minimum in said comparator and said control circuit so that the number of circuit elements which are continuously active and consuming energy are reduced; whereby power consumption is reduced.

43. In an electronic system having a processor, a device, and a communications link supporting communications between said processor and said device, said system being operative to perform a plurality of substantially overlapping tasks in a multi-tasking environment wherein only one of said plurality of substantially overlapping tasks is actually executing during a particular segment of time; a method for managing power consumed by said system comprising:

associating a unique device identifier with said device;

broadcasting said unique device identifier over said communications link only when said device will actually be accessed by said electronic system in performing a particular task during said particular segment of time and irrespective of whether said particular task utilizing said device during said particular segment of time has been completed; and providing an operation enable signal required for operation of said device only when said broadcast unique device identifier is received by said device and otherwise withholding said operation enable signal from said device, receipt of said operation enable signal causing said device to transition from a non-operational power conservative state to an operational state wherein said device consumes more power than when in said non-operational state, only during said particular segment of time when said device is being accessed.

44. The method in claim 43, wherein said communications link is a bus operating to communicate information including to broadcast said unique device identifiers at a bus clock rate, and said particular segment of time is an integral number of bus cycles.

45. The method in claim 43, wherein said communications link is a bus operating to communicate information including to broadcast said unique device identifiers at a bus clock rate, and said particular segment of time is one bus cycle.

46. In a computer system having a plurality of devices, and a communications link for communicating a broadcast device identifier to said plurality of devices, said computer system operating to perform a plurality of overlapping tasks in a multi-tasking environment, a method for managing power consumption in said computer system comprising:

associating a unique device identifier with each said device;

monitoring communications over said communications link, by each said device, during a time period to determine broadcast device identifiers contained within said monitored communication;

comparing said broadcast device identifier with said unique device identifier associated with each said device to determine whether said broadcast device identifiers match said unique device identifier for any of said devices;

withholding a device operating input to ones of said plurality of devices when said broadcast device identifier does not match said unique device identifiers associated with said ones of said plurality of devices; and providing said device operating input to ones of said devices only when said broadcast device identifier matches said unique device identifier for said device;

said computer system operating to perform a plurality of substantially simultaneous operations in a multi-tasking environment, broadcasting said unique device identifier only during a time period in which said device is actually being accessed by said computer system, independent of whether a particular processing task using said device associated with said unique device identifier during said time period has been completed; and providing said device operating input only to said device when said device is actually being accessed by said computer system.

47. The method in claim 46, wherein said communications link comprises at least one bus, and said time period is a single bus cycle.

* * * * *